US012613984B2

(12) United States Patent
Muniraju et al.

(10) Patent No.: US 12,613,984 B2
(45) Date of Patent: *Apr. 28, 2026

(54) INDEXING AND QUERYING OF PRINCIPALS ASSOCIATED WITH A FILE SYSTEM

(71) Applicant: Rubrik, Inc., Palo Alto, CA (US)

(72) Inventors: Muraliraja Muniraju, Fremont, CA (US); Nandish Kotadia, Bangalore (IN); Fabiano Botelho, Pleasanton, CA (US); Mudit Malpani, Sunnyvale, CA (US); Adam Gee, Palo Alto, CA (US)

(73) Assignee: Rubrik, Inc., Palo Alto, CA (US)

( * ) Notice: Subject to any disclaimer, the term of this patent is extended or adjusted under 35 U.S.C. 154(b) by 241 days.

This patent is subject to a terminal disclaimer.

(21) Appl. No.: 18/502,617

(22) Filed: Nov. 6, 2023

(65) Prior Publication Data

US 2025/0148096 A1    May 8, 2025

(51) Int. Cl.
*H04L 29/06* (2006.01)
*G06F 21/60* (2013.01)
*G06F 21/62* (2013.01)

(52) U.S. Cl.
CPC ........ *G06F 21/604* (2013.01); *G06F 21/6245* (2013.01); *G06F 2221/2113* (2013.01); *G06F 2221/2141* (2013.01)

(58) Field of Classification Search
CPC ............... G06F 21/604; G06F 21/6245; G06F 2221/2113; G06F 2221/2141
See application file for complete search history.

(56) References Cited

U.S. PATENT DOCUMENTS

| | | | |
|---|---|---|---|
| 7,991,791 B1 | 8/2011 | Chen et al. | |
| 10,922,007 B2 | 2/2021 | Rathi et al. | |
| 11,003,787 B2 * | 5/2021 | Sion | G06F 16/178 |
| 11,157,451 B2 | 10/2021 | Moldvai et al. | |
| 2018/0210950 A1 * | 7/2018 | Zuckerman | G06F 16/288 |
| 2020/0409796 A1 * | 12/2020 | Terei | G06F 11/1469 |

* cited by examiner

*Primary Examiner* — Evans Desrosiers
(74) *Attorney, Agent, or Firm* — Holland & Hart LLP

(57) ABSTRACT

Methods, systems, and devices for data management are described. A data management system (DMS) may obtain a snapshot of a file system that includes multiple files and permission sets associated with the files. A permission may indicate one or more access approvals for associated principals. The DMS may assign unique values to the permission sets, where each unique value identifies a respective permission set. The DMS may store a first mapping between the files and the unique values based on the permission sets that correspond to the files. The DMS may store a second mapping between the principals and the unique values based on an evaluation of the permission sets. The DMS may use the first mapping and the second mapping to identify, for a principal, a set of files to which the principal has access.

20 Claims, 11 Drawing Sheets

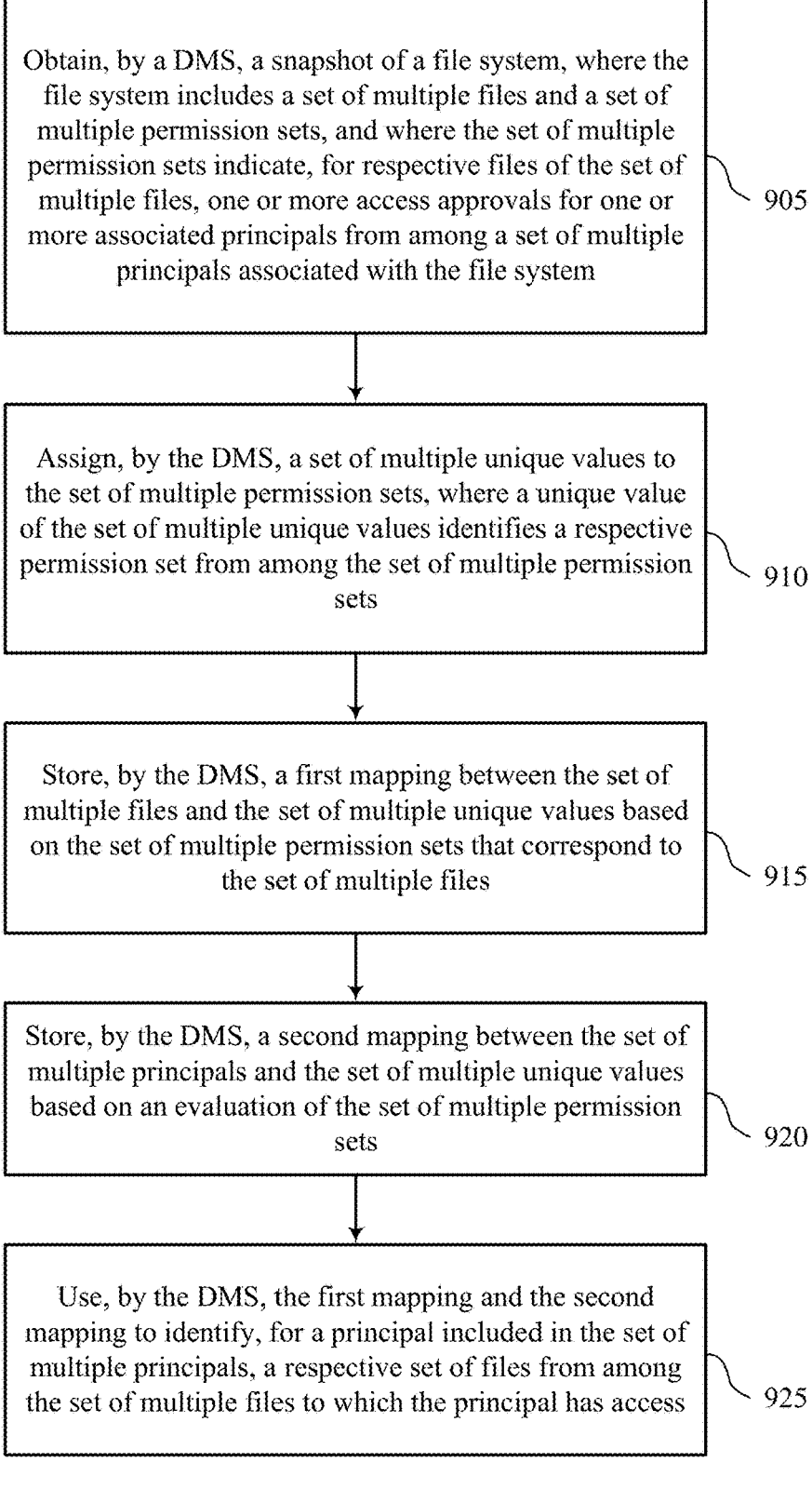

Obtain, by a DMS, a snapshot of a file system, where the file system includes a set of multiple files and a set of multiple permission sets, and where the set of multiple permission sets indicate, for respective files of the set of multiple files, one or more access approvals for one or more associated principals from among a set of multiple principals associated with the file system

905

Assign, by the DMS, a set of multiple unique values to the set of multiple permission sets, where a unique value of the set of multiple unique values identifies a respective permission set from among the set of multiple permission sets

910

Store, by the DMS, a first mapping between the set of multiple files and the set of multiple unique values based on the set of multiple permission sets that correspond to the set of multiple files

915

Store, by the DMS, a second mapping between the set of multiple principals and the set of multiple unique values based on an evaluation of the set of multiple permission sets

920

Use, by the DMS, the first mapping and the second mapping to identify, for a principal included in the set of multiple principals, a respective set of files from among the set of multiple files to which the principal has access

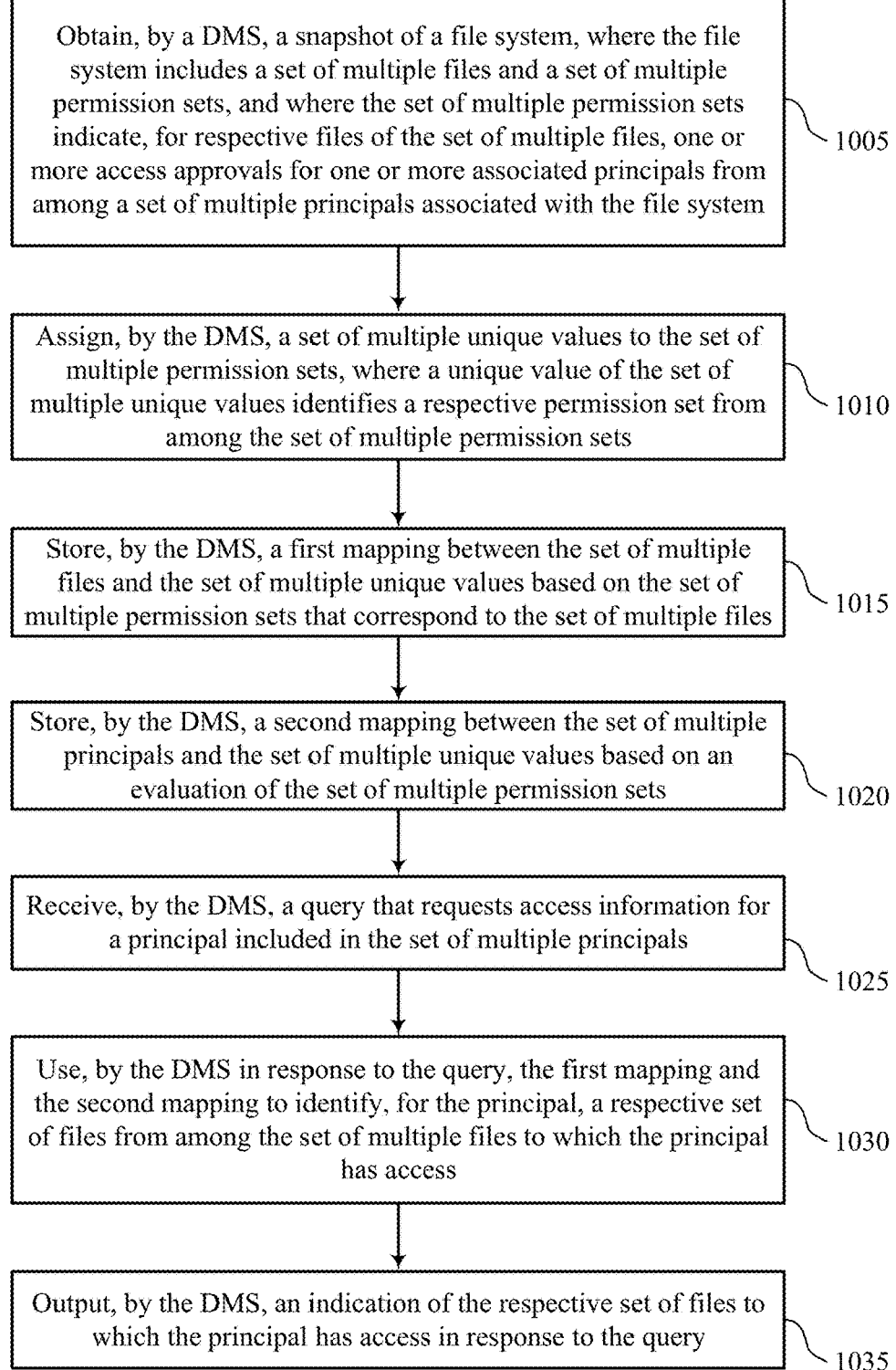

Obtain, by a DMS, a snapshot of a file system, where the file system includes a set of multiple files and a set of multiple permission sets, and where the set of multiple permission sets indicate, for respective files of the set of multiple files, one or more access approvals for one or more associated principals from among a set of multiple principals associated with the file system ⟋ 1005

Assign, by the DMS, a set of multiple unique values to the set of multiple permission sets, where a unique value of the set of multiple unique values identifies a respective permission set from among the set of multiple permission sets ⟋ 1010

Store, by the DMS, a first mapping between the set of multiple files and the set of multiple unique values based on the set of multiple permission sets that correspond to the set of multiple files ⟋ 1015

Store, by the DMS, a second mapping between the set of multiple principals and the set of multiple unique values based on an evaluation of the set of multiple permission sets ⟋ 1020

Receive, by the DMS, a query that requests access information for a principal included in the set of multiple principals ⟋ 1025

Use, by the DMS in response to the query, the first mapping and the second mapping to identify, for the principal, a respective set of files from among the set of multiple files to which the principal has access ⟋ 1030

Output, by the DMS, an indication of the respective set of files to which the principal has access in response to the query ⟋ 1035

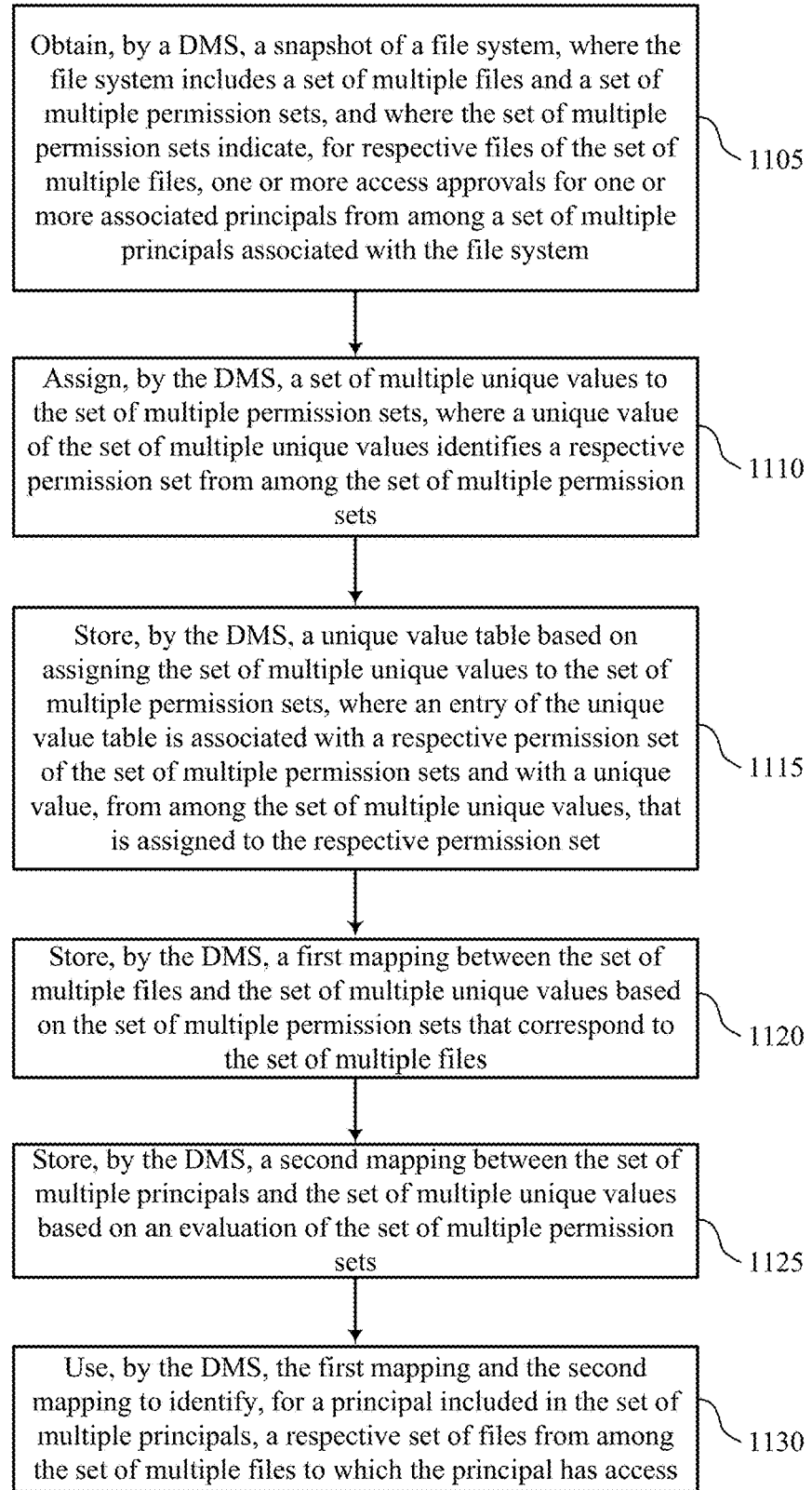

Obtain, by a DMS, a snapshot of a file system, where the file system includes a set of multiple files and a set of multiple permission sets, and where the set of multiple permission sets indicate, for respective files of the set of multiple files, one or more access approvals for one or more associated principals from among a set of multiple principals associated with the file system
1105

Assign, by the DMS, a set of multiple unique values to the set of multiple permission sets, where a unique value of the set of multiple unique values identifies a respective permission set from among the set of multiple permission sets
1110

Store, by the DMS, a unique value table based on assigning the set of multiple unique values to the set of multiple permission sets, where an entry of the unique value table is associated with a respective permission set of the set of multiple permission sets and with a unique value, from among the set of multiple unique values, that is assigned to the respective permission set
1115

Store, by the DMS, a first mapping between the set of multiple files and the set of multiple unique values based on the set of multiple permission sets that correspond to the set of multiple files
1120

Store, by the DMS, a second mapping between the set of multiple principals and the set of multiple unique values based on an evaluation of the set of multiple permission sets
1125

Use, by the DMS, the first mapping and the second mapping to identify, for a principal included in the set of multiple principals, a respective set of files from among the set of multiple files to which the principal has access
1130

FIG. 11                1100

INDEXING AND QUERYING OF PRINCIPALS ASSOCIATED WITH A FILE SYSTEM

FIELD OF TECHNOLOGY

The present disclosure relates generally to data management, including techniques for indexing and querying of principals associated with a file system.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

BRIEF DESCRIPTION OF THE DRAWINGS

FIGS. 9 through 11 show flowcharts illustrating methods that support indexing and querying of principals associated with a file system in accordance with aspects of the present disclosure.

DETAILED DESCRIPTION

Figure 1:
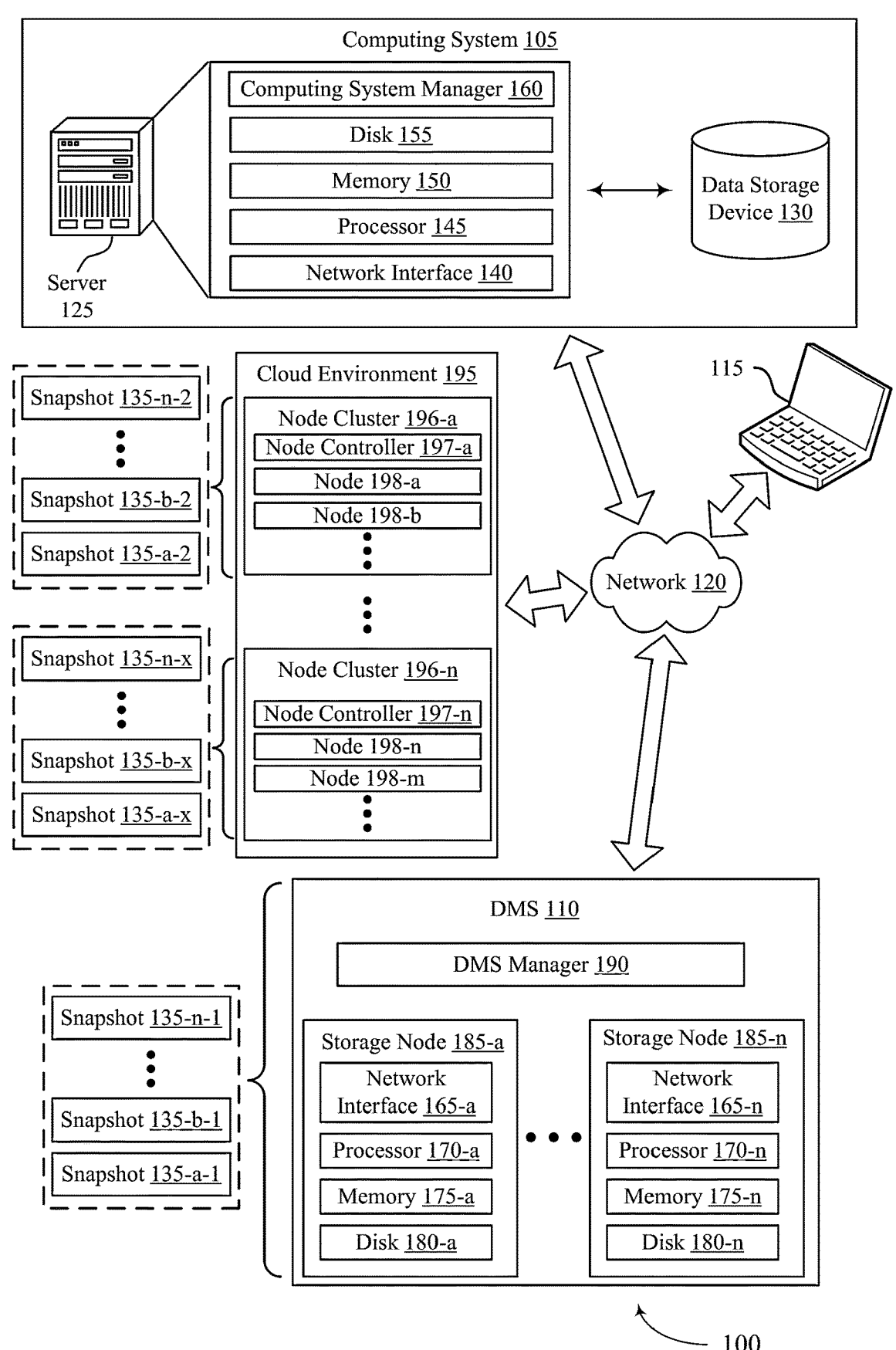
FIG. 1 illustrates an example of a computing environment that supports indexing and querying of principals associated with a file system in accordance with aspects of the present disclosure.

A data management system (DMS) may manage backup and recovery of data for a client. To back up a file system of the client, the DMS may obtain a snapshot of the file system. The DMS may index the file system to determine which files include various types of information and the files to which certain principals have access. A principal may represent any entity in a hierarchical structure of entities associated with the file system. For example, a principal may be an individual user, a group of users, a role within a system, one or more other entities within a hierarchy, or any combination thereof that has access to one or more portions of the file system. A group that is a principal may be a direct group of users or may be a group of multiple other groups (e.g., a group may be of subgroups). An identity management system (IMS) may manage access to the file system for one or more types of principals, and the types of principals may vary across different IMSs, different file systems, or both—it is to be understood that the teachings herein may be applied to systems involving any types of principles, and the specific types of principles mentioned herein are merely examples.

Indexed information as described herein may be used by the DMS, by the client, or both to assess a risk associated with the file system. Such techniques may be used, for example, to determine which users have access to sensitive data (e.g., personally identifiable information (PII), personal medical information, or other sensitive or high risk data) within the customer's system. Techniques for indexing file systems with reduced complexity may be beneficial.

Techniques, systems, and devices described herein provide for a DMS to leverage one or more permissions associated with the file system to index the file system with a relatively low complexity and processing. For a snapshot of a file system, each file subject to the snapshot is associated with a respective security descriptor, which may include a set of one or more permissions for access to the file. The permissions may be generated by humans. As such, a quantity of permissions may be relatively small as compared with quantities of principals and files in the file system. In some examples, a set of one or more permissions may be represented by an access control list (ACL), which may be referred to as a discretionary ACL (DACL), in some examples herein. Each ACL may indicate a set of principals that have permission to access the file. ACLs are just one example of a permission set; generally, a permission set may be any information entity that indicates which principals do or do not have access to a particular file or set of files within a file system or object store.

The quantity of files in the file system and the quantity of principals associated with the file system may both be very large. The permission sets, however, may be created by humans, such that a quantity of unique permission sets for the file system may be much smaller than the quantity of files or the quantity of principals. The DMS may leverage this property to index the files with reduced complexity. For example, each file in a snapshot of the file system may be associated with a respective set of one or more permissions. As the DMS decodes the snapshot, the DMS may assign every set of permissions to a unique value (e.g., rank). Each file may then be associated with at least one of the unique values via association between the file and a corresponding set of permissions. The DMS may subsequently evaluate every set of permissions to identify all principals that are indicated via the set of permissions. The DMS may perform reverse indexing to associate each principal with a list of one or more unique values in which the principal is included. The DMS may thereby maintain a first mapping between permission sets and files associated with each permission set and a second mapping between principals and unique permission set values. The DMS may be able to derive such mappings more efficiently than using other indexing techniques (e.g., relative to other techniques in which unique permission sets are not used as a basis of indexing), among other possible advantages.

If the DMS subsequently receives a query for a given principal, the DMS may utilize the first and second mappings to identify a list of unique permission set values that the principal is a part of and then identify a set of files that the permission sets have access to. The DMS may thereby output the set of files the principal has access to. Thus, the described techniques may reduce memory consumption, processing, and power consumption while maintaining support for a DMS to identify user accesses within a file system, among other examples.

FIG. 1 illustrates an example of a computing environment 100 that supports indexing and querying of principals associated with a file system in accordance with aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally, or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185.

Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a file system, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or file systems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot 135 to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally, or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots 135, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally, or alternatively, the DMS 110 may detect whether aspects of the computing system 105 have been impacted by malware (e.g., ransomware). Additionally, or alternatively, the DMS 110 may relocate data or create copies of data based on using one or more snapshots 135 to restore the associated computing object within its original location or at a new location (e.g., a new location within a different computing system 105). Additionally, or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some examples, the DMS 110, and in particular the DMS manager 190, may be referred to as a control plane. The control plane may manage tasks, such as storing data management data or performing restorations, among other possible examples. The control plane may be common to multiple customers or tenants of the DMS 110. For example, the computing system 105 may be associated with a first customer or tenant of the DMS 110, and the DMS 110 may similarly provide data management services for one or more other computing systems associated with one or more additional customers or tenants. In some examples, the control plane may be configured to manage the transfer of data management data (e.g., snapshots 135 associated with the computing system 105) to a cloud environment 195 (e.g., Microsoft Azure or Amazon Web Services). In addition, or as an alternative, to being configured to manage the transfer of data management data to the cloud environment 195, the control plane may be configured to transfer metadata for the data management data to the cloud environment 195. The metadata may be configured to facilitate storage of the stored data management data, the management of the stored management data, the processing of the stored management data, the restoration of the stored data management data, and the like.

Each customer or tenant of the DMS 110 may have a private data plane, where a data plane may include a location at which customer or tenant data is stored. For example, each private data plane for each customer or tenant may include a node cluster 196 across which data (e.g., data management data, metadata for data management data, etc.) for a customer or tenant is stored. Each node cluster 196 may include a node controller 197 which manages the nodes 198 of the node cluster 196. As an example, a node cluster 196 for one tenant or customer may be hosted on Microsoft Azure, and another node cluster 196 may be hosted on Amazon Web Services. In another example, multiple separate node clusters 196 for multiple different customers or tenants may be hosted on Microsoft Azure. Separating each customer or tenant's data into separate node clusters 196 provides fault isolation for the different customers or tenants and provides security by limiting access to data for each customer or tenant.

The control plane (e.g., the DMS 110, and specifically the DMS manager 190) manages tasks, such as storing backups or snapshots 135 or performing restorations, across the multiple node clusters 196. For example, as described herein, a node cluster 196-*a* may be associated with the first customer or tenant associated with the computing system 105. The DMS 110 may obtain (e.g., generate or receive) and transfer the snapshots 135 associated with the computing system 105 to the node cluster 196-*a* in accordance with a service level agreement for the first customer or tenant associated with the computing system 105. For example, a service level agreement may define backup and recovery parameters for a customer or tenant such as snapshot generation frequency, which computing objects to backup, where to store the snapshots 135 (e.g., which private data plane), and how long to retain snapshots 135. As described herein, the control plane may provide data management services for another computing system associated with another customer or tenant. For example, the control plane may generate and transfer snapshots 135 for another computing system associated with another customer or tenant to the node cluster 196-*n* in accordance with the service level agreement for the other customer or tenant.

To manage tasks, such as storing backups or snapshots 135 or performing restorations, across the multiple node clusters 196, the control plane (e.g., the DMS manager 190) may communicate with the node controllers 197 for the various node clusters via the network 120. For example, the control plane may exchange communications for backup and recovery tasks with the node controllers 197 in the form of transmission control protocol (TCP) packets via the network 120.

In some examples, the DMS 110 may index a snapshot 135 of a file system to determine which files in the snapshot 135 include various types of information and the files to which certain principals have access. A principal may represent any entity in a hierarchical structure of entities associated with the file system. For example, a principal may be an individual user, a group of users, a role within a system, one or more other entities or policies within a hierarchy, or any combination thereof that has access to the file system. A group that is a principal may be a direct group of users or may be a group of multiple other groups (e.g., subgroups). The indexed information may be used by the DMS 110, a client, or both to assess a risk associated with the file system. Such techniques may be used, for example, to determine which users have access to sensitive data (e.g., PII, personal medical information, or other sensitive or high risk data) within the customer's system. Some techniques for indexing the file system may be associated with relatively high complexity and memory consumption.

As described herein, the DMS 110 may utilize permission information to index the file system with relatively low complexity and memory consumption. The snapshot 135 of the file system may include a respective security descriptor for each file. A security descriptor may include a set of one or more permissions. Each permission set may indicate a set of principals that have permission to access the file. The quantity of files in the file system and the quantity of principals associated with the file system may both be very large. The permission sets, however, may be created by humans, such that a quantity of unique permission sets for the file system may be much smaller than the quantity of files or the quantity of principals. The DMS 110 may leverage this property to index the files with reduced complexity. For example, as the DMS 110 decodes the snapshot, the DMS 110 may assign every set of permissions to a unique value (e.g., rank). Each file may then be associated with at least one of the unique values via association between the file and a corresponding set of permissions. The DMS 110 may subsequently evaluate every permission set to identify all principals that are indicated via the permission set. The DMS 110 may perform reverse indexing to associate each principal with a list of one or more unique permission set values in which the principal is included. The DMS 110 may thereby maintain a first mapping between permission sets and files associated with each permission set and a second mapping between principals and unique permission set values. The DMS 110 may be able to derive such mappings more efficiently than using other indexing techniques (e.g., relative to other techniques in which permissions are not used as a basis of indexing), among other possible advantages.

If the DMS 110 subsequently receives a query for a given principal, the DMS 110 may utilize the first and second mappings to identify a list of unique permission set values that the principal is a part of and then identify a set of files that the permission sets have access to. The DMS 110 may thereby output the set of files the principal has access to. Thus, the described techniques may reduce memory consumption, processing, and power consumption while maintaining support for a DMS 110 to identify user accesses within a file system.

Figure 2:
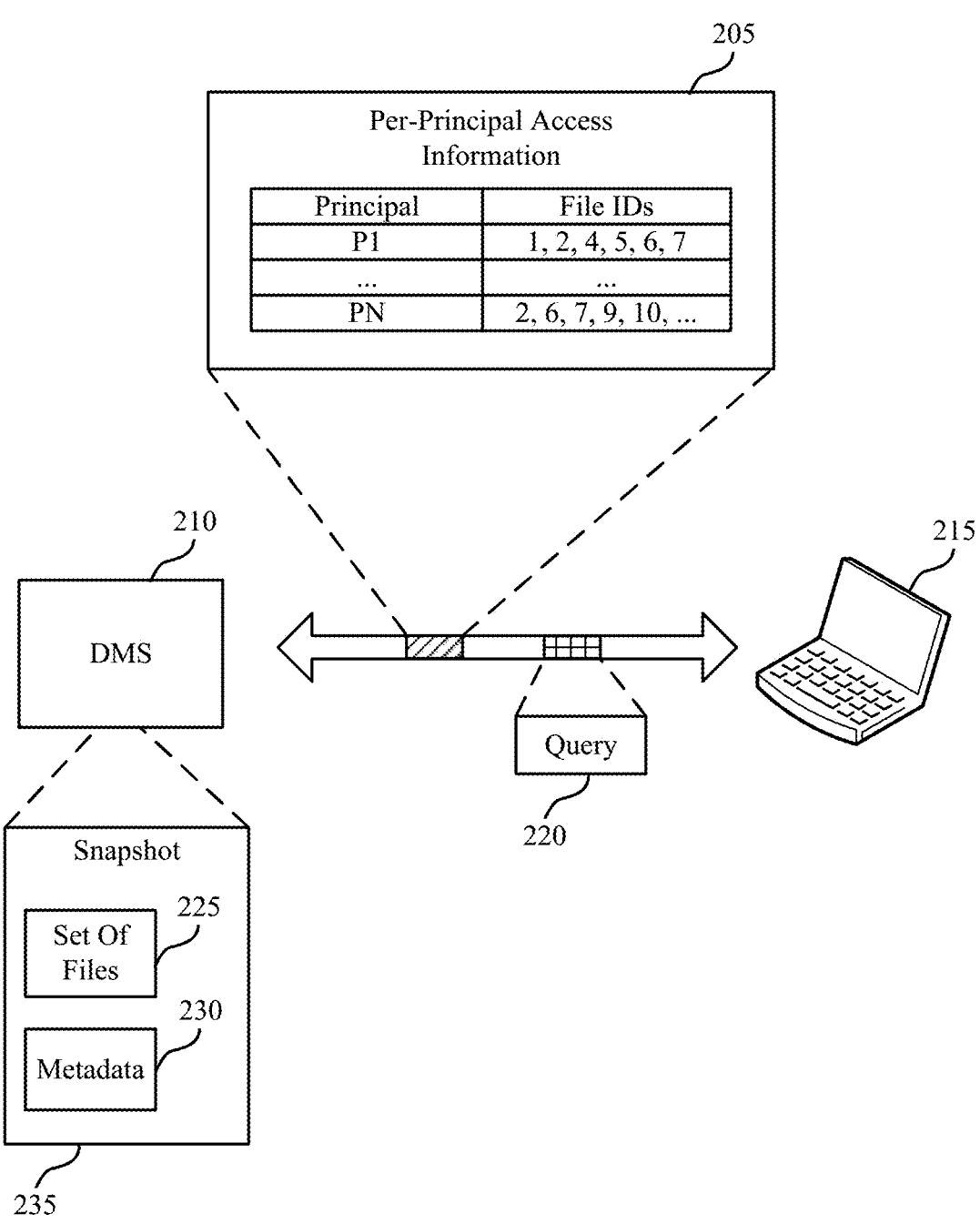
FIG. 2 shows an example of a computing environment that supports indexing and querying of principals associated with a file system in accordance with aspects of the present disclosure.

FIG. 2 shows an example of a computing environment 200 that supports indexing and querying of principals associated with a file system in accordance with aspects of the present disclosure. The computing environment 200 may implement or be implemented by aspects of the computing environment 100 described with reference to FIG. 1. For example, the computing environment 200 includes a DMS 210 and a computing device 215, which may represent examples of a DMS 110 and a computing device 115 as described with reference to FIG. 1.

The DMS 210 may provide data backup and recovery services for data of a client associated with the computing device 215. The DMS 210 may obtain a snapshot 235 of a file system of the client. The snapshot 235 may be a full snapshot or an incremental snapshot (e.g., an incremental snapshot chain), as described with reference to FIG. 1. The snapshot 235 may include a set of files 225 of the file system and metadata 230 associated with the set of files 225, which may be referred to as file metadata in some examples. The metadata 230 may include a security descriptor for each file of the set of files 225. For example, the metadata 230 may include one or more permissions associated with each file in the set of files 225, as described in further detail elsewhere herein, including with reference to FIG. 3.

After obtaining the snapshot 235, the DMS 210 may index the snapshot 235 to determine which files include various types of information and the files to which certain principals have access. A principal may be a user or a group of users that access and use the file system. The indexed information may be used by the DMS 210, a client, or both to assess a risk associated with the file system. Such techniques may be used, for example, to determine which users have access to sensitive data (e.g., PII, personal medical information, or other sensitive or high risk data) within the customer's system. In some cases, the DMS 210 may index the file system by iterating through all principals in the system and again over all files in the system. However, such techniques may be associated with relatively high complexity and memory consumption due to the file system including a relatively large quantity of files and a relatively large quantity of users. For example, if there are one million files and one million users, the DMS 210 may perform one trillion operations to index the file system, which may consume a relatively long time period and a relatively high amount of power.

As described herein, to reduce complexity associated with indexing the file system, the DMS 210 may index the file system based on permission information. permission information may provide access approvals or denials for various files in the file system and may be generated by humans. As such, a quantity of permissions may be significantly less than a quantity of users and a quantity of files in the file system. By leveraging this property of the permission information, the DMS 210 may perform more efficient indexing. For example, the DMS 210 may generate a first mapping between files and unique permission values, as described in further detail elsewhere herein, including with reference to FIG. 3. The DMS 210 may generate a second mapping between principals and the unique permission values, as described in further detail elsewhere herein, including with reference to FIG. 4. The DMS 210 may utilize the first and second mappings, each of which are indexed over permissions, to identify per-principal access information 205. That is, the DMS 210 may utilize the first and second mappings to identify, for each principal, which files the principal has access to in the system.

In some examples, the DMS 210 may receive a query 220 from the client via the computing device 215 (e.g., via a user interface or some other interface between the DMS 210 and the computing device 215). The query 220 may include a request for per-principal access information 205. For example, the query 220 may indicate an ID associated with one or more principals (e.g., a security ID (SID) or some other unique ID) and may request for files to which the principals have access in the client's system. The DMS 210 may receive the query 220 and may identify the per-principal access information 205 using the first and second mappings. For example, the DMS 210 may identify unique values associated with the one or more principals indicated via the query 220 (e.g., based on the second mapping), and the DMS 210 may filter over the files to identify which files are associated with the same unique values. The DMS 210 may thereby determine a set of one or more files to which the principals have access. The DMS 210 may output (e.g., send, transmit) the per-principal access information 205 indicating the IDs of the one or more principals requested by the client and the respective sets of files to which each of the one or more principals has access.

Figure 3:
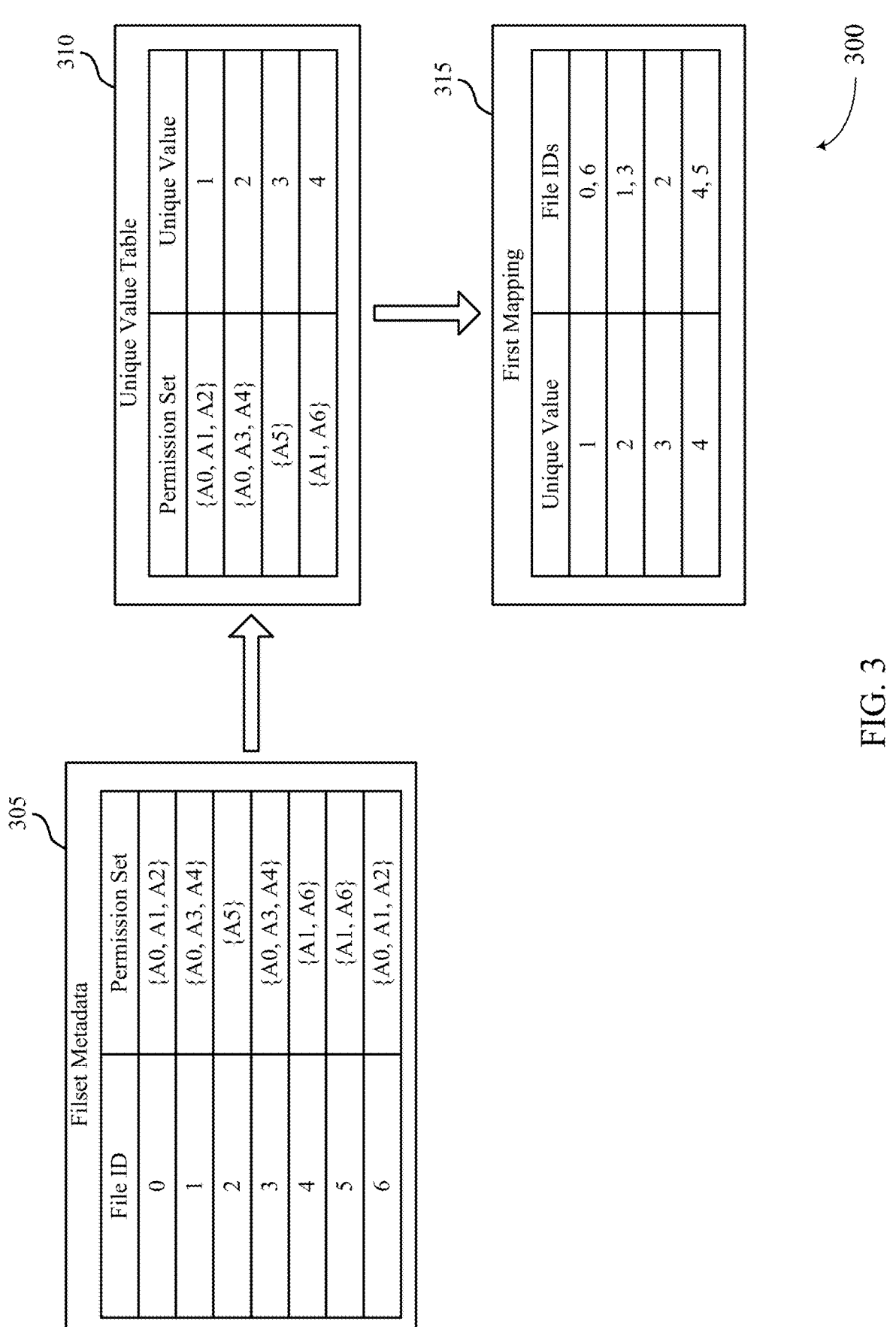
FIG. 3 shows an example of a unique value mapping scheme that supports indexing and querying of principals associated with a file system in accordance with aspects of the present disclosure.

FIG. 3 shows an example of a unique value mapping scheme 300 that supports indexing and querying of principals associated with a file system in accordance with aspects of the present disclosure. The unique value mapping scheme 300 may implement or be implemented by aspects of the computing environments 100 and 200 as described with reference to FIGS. 1 and 2. For example, the unique value mapping scheme 300 illustrates file metadata 305, which may be stored with a snapshot of a file system at a DMS. The DMS may use the permission information in the file metadata 305 to efficiently index principals and corresponding files to which the principals have access within the file system.

The DMS may obtain a snapshot of a file system, as described in further detail elsewhere herein, including with reference to FIG. 2. The snapshot may include the file metadata 305 for files in the snapshot. The file metadata 305 may include, among other types of information, security descriptors associated with the files included in the snapshot. In some examples, a file may be referred to as a path. Each security descriptor may be indexed by an ID of a file. Although the IDs in FIG. 3 are illustrated as 0 through 6, it is to be understood that a file ID may be any quantity of bits that represent any value, including the values shown in FIG. 3 or other values not shown. Additionally, the file system may include any quantity of files. Each security descriptor may further include a set of one or more permissions, which may be referred to as a permission set herein. Each permission set may indicate one or more principals that have access to the corresponding file. A file may be associated with a single permission or multiple permissions.

The sets of permissions may be generated by humans (e.g., system users or engineers). As such, a unique quantity of different permissions for the file system may be smaller than a quantity of principals, than a quantity of files in the file system, or both. The DMS may utilize this property of the permissions to generate a two-level index of the file system. The indexing techniques described herein may provide for the DMS to efficiently index the principals and corresponding files to which the principals have access in the file system.

A first level of the index may include indexing the files to unique permission set values. The DMS may first assign every permission set to a unique value, which may be referred to as a rank, in some examples. The DMS may store the unique values in a unique value table 310, which may be a table that maps the permission sets to the unique values. The unique value table 310 may be stored at the DMS or in some other cloud location that is accessible by the DMS. To assign the unique values, the DMS may scan the file metadata 305 in order of the file IDs. The DMS may determine, for each file, whether the unique value table 310 already includes an entry for the permission set that is associated with the file. The permission set may be a set of one or more permissions that are listed in the security descriptor for the file. For example, for the file with ID 0 illustrated in FIG. 3, the permission set may include three permissions: A0, A1, and A2 (where A may represent a permission, such as a permission for a corresponding principal to access the file). If the unique value table 310 does not include an entry for the permission set, the DMS may generate an entry in the unique value table 310 that is associated with the permission set. The DMS may store a unique value for the permission set in the entry. The DMS may perform multiple iterations of the unique value assigning process until a unique value is assigned for each unique permission set in the file metadata 305.

In the example of FIG. 3, the DMS may generate the unique value table 310, which may be empty at first. The DMS may scan the file metadata 305 and determine that a first permission set {A0, A1, A2}associated with the first file having ID 0 is not associated with an entry in the unique value table 310. The DMS may generate an entry for the first permission set and may assign a first unique value to the first permission set (e.g., unique value of 1, or some other value). The DMS may continue scanning the file metadata 305 and may identify that the file having ID 1 is associated with a second permission set that is different than the first permission set. The DMS may generate an entry for the second permission set in the unique value table 310 and may assign, to the second permission set, a second unique value that is, by definition, unique and therefore different from the first unique value (e.g., unique value of 2, or some other value). The DMS may continue to scan the file metadata 305, identify new permission sets, and store corresponding unique values in the unique value table 310 until the DMS identifies a permission set that is already associated with an entry in the unique value table 310. For example, the file with ID 3 may be associated with the same permission set (e.g., {A0, A3, A4}) as the file with ID 1. In such cases, the DMS may not generate a new entry or unique value for the permission set. Instead, the DMS may continue to perform subsequent iterations of the scanning operation. For example, the DMS may subsequently scan the file with ID 4 and identify a permission set including A1 and A6. The DMS may generate a unique value (e.g., 4, or some other value) for the permission set.

After the DMS scans all of the file metadata 305 and assigns a unique value to each unique permission set, the DMS may generate a first mapping 315 between the unique values and the files that are associated with the unique values. A file may be associated with a unique value based on a security descriptor for the file including a permission set that is assigned to the unique value. To generate the first mapping 315, the DMS may perform one or more iterations of a mapping operation. Each iteration may include the DMS scanning the file metadata 305 for a given unique value from the unique value table 310. The DMS may identify any files in the file metadata 305 that are associated with the permission set that is assigned to the unique value. The DMS may generate a new entry in a table for the first mapping 315 for each unique value. The DMS may update the entry for a given unique value to include IDs of all of the files identified during the scanning of the file metadata. In the example of FIG. 3, the first unique value may be mapped to IDs 0 and 6 because both of these files may be associated with the same permission set assigned to the first unique value. The DMS may continue to perform remaining iterations for each remaining unique value until the DMS has identified files for each unique value and the first mapping 315 is complete.

Although the unique values are shown as single digit integers in the example of FIG. 3, it is to be understood that the unique values may be any value that uniquely identifies a permission set. In some examples, each unique value may be a bitmap with a unique set of one or more bits set high and remaining bits set low. For example, the bitmap may include a same quantity of bits as a quantity of principals in the system, and each principal may be assigned to a unique bit position. If the permission set includes (e.g., indicates permission for) a principal, the bit position for the principal may be set high in the permission set bitmap. Additionally, or alternatively, each unique value may be a different numerical value, such as a unique ID or a unique sequence, or the like.

Figure 4:
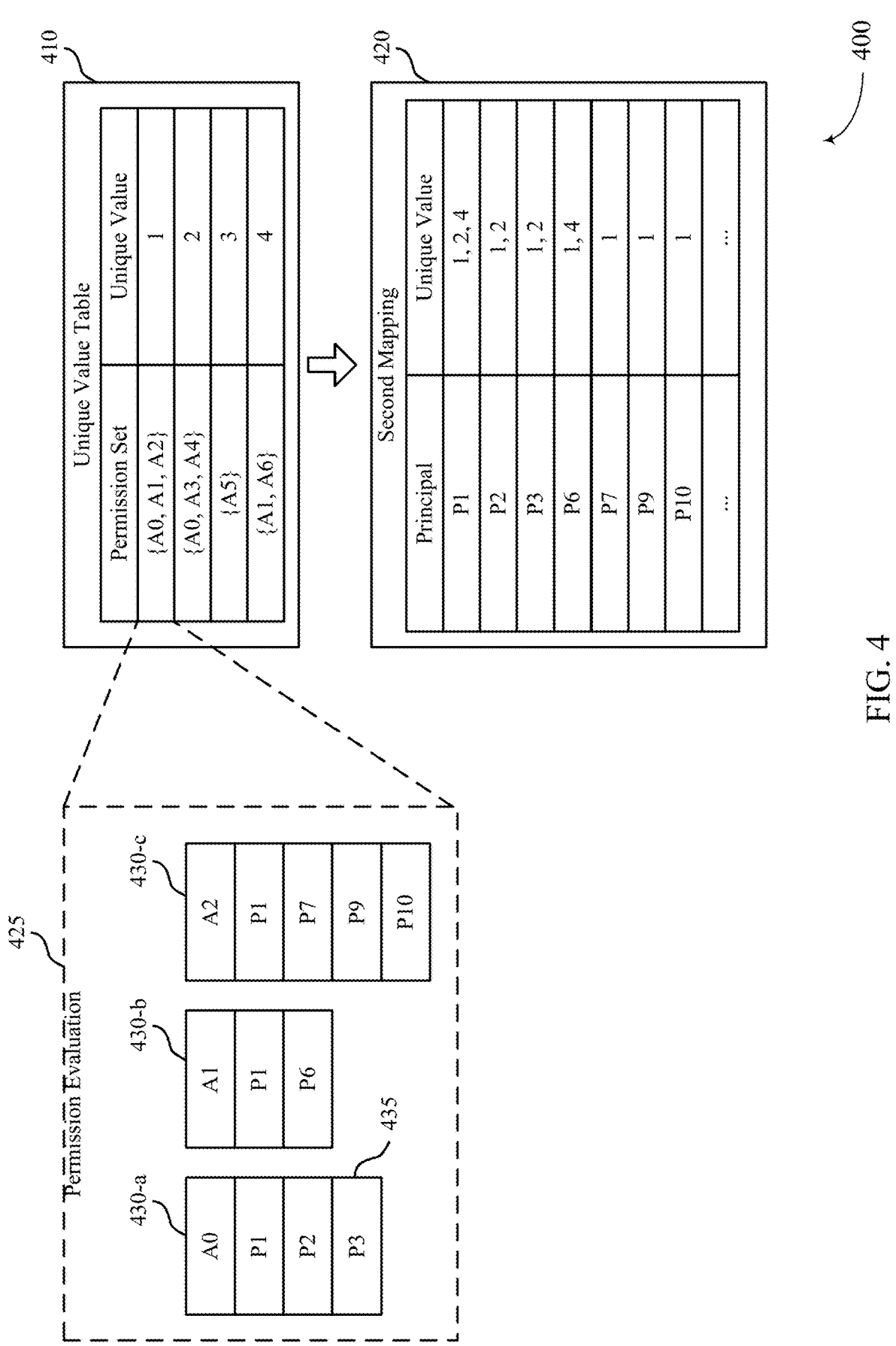
FIG. 4 shows an example of a second mapping scheme that supports indexing and querying of principals associated with a file system in accordance with aspects of the present disclosure.

The DMS may perform a second level of the indexing by associating principals to unique values, as described elsewhere herein, including with reference to FIG. 4. By performing the file system indexing for a snapshot using the permission sets, the DMS may reduce processing and latency associated with the indexing as compared with other systems that may scan every file path and every principal in the file system to generate the index, at least because a quantity of unique permission sets may be less than a quantity of principals in the system. For example, if there are one million files in the file system, and there are 100 different permission sets, the DMS may perform the indexing in around 100 million operations, which may be less than a quantity of operations if the DMS indexes over one million files and one million users.

FIG. 4 shows an example of a second mapping scheme 400 that supports indexing and querying of principals associated with a file system in accordance with aspects of the present disclosure. The second mapping scheme 400 may implement or be implemented by aspects of the computing environments 100 and 200 as described with reference to FIGS. 1 and 2 and the unique value mapping scheme 300 as described with reference to FIG. 3. For example, the second mapping scheme 400 illustrates a unique value table 410, which may be generated by a DMS based on file metadata. The unique value table 410 may represent an example of the unique value table 310 described with reference to FIG. 3.

As described with reference to FIG. 3, the DMS may obtain a snapshot of a file system and may perform a scanning operation to index the file system by unique values. The DMS may generate the unique value table 410 and a first mapping (e.g., the first mapping 315 illustrated in FIG. 3) that maps the unique values to corresponding files in the file system. As part of a second layer of the file system indexing operation, the DMS may generate a second mapping 420 that may map principals to unique values.

To start the second layer of the indexing, in some examples, the DMS may perform a permission evaluation 425. For example, the DMS may determine, for each permission 430, a set of one or more principals 435 that are included in (e.g., permitted by) the permission 430. The DMS may determine the set of one or more principals 435 via one or more permission evaluation techniques. In some examples, a permission 430 may include a sequential order of permissions and denials (such as, e.g., when the permission 430 is an ACL), and the DMS may evaluate the permission 430 according to a function to identify which principals are permitted by the permission 430. The DMS may utilize any other techniques for evaluating the permissions 430 to determine which principals 435 are permitted by the permissions 430.

In some examples, a permission 430 may indicate a group of two or more users, and the DMS may identify the descendants of the group in order to identify a most granular set of principals 435 (e.g., users) that are included in the permission 430. In some examples, the permission evaluation 425 may produce a bitmap associated with the permission set, where the bitmap includes a quantity of bits that is equal to a quantity of principals in the system, and each principal may be mapped to a respective bit position. The bitmap may include one or more bits set high in bit positions corresponding to principals included in the permission set. In some examples, such bitmaps may represent the unique values for each permission set. For example, the DMS may assign sequential numerical values to the permission sets, or the DMS may evaluate the permission sets and use the resulting bitmaps as the unique values. It is to be understood that the DMS may evaluate the permissions 430 at any time, including before assigning the unique values, after assigning the unique values but before generating the first mapping 315, after generating the first mapping 315, or any other time relative to the other indexing operations.

In the example of FIG. 4, the DMS may evaluate each of the permissions 430-*a* (A0), 430-*b* (e.g., A1), and 430-*c* (e.g., A2) in the first permission set associated with the unique value of 1. The permission 430-*a* may indicate that three principals 435 (e.g., P1, P2, and P3) are permitted to access a corresponding file. The permission 430-*b* may indicate that two principals (e.g., P1 and P6) are permitted to access a corresponding file. The permission 430-*c* may indicate that four principals (e.g., P1, P7, P9, and P10) are permitted to access a corresponding file. As such, the first permission set may include (e.g., indicate permission for) seven different principals (e.g., P1, P2, P3, P6, P7, P9, and P10). The DMS may perform similar permission evaluations 425 for each permission set. The principals 435 illustrated in FIG. 4 may be users. Additionally, or alternatively, one or more of the principals 435 may represent a group of two or more users. In such cases, the DMS may evaluate descendants of the group based on a hierarchy of principals to identify users that are included in the permission 430.

The DMS may utilize a respective permission evaluation 425 for each permission set to generate the second mapping 420. The second mapping 420 may be a table that includes an entry for each principal. The DMS may iterate over each principal, each permission set, or both. For a given principal, the DMS may determine whether an entry in the second mapping 420 has been generated. The DMS may generate a new entry if an entry has not been generated, or may add to an existing entry for the principal 435. If the DMS iterates over permission sets, the DMS may evaluate each permission set to identify principals 435 identified by the respective permission set, and the DMS may update the entries in the second mapping 420 for each of the identified principals 435 to include a unique value assigned to the respective permission set. For example, once the DMS evaluates the first permission set, the DMS may update entries and/or generate entries for the principals P1, P2, P3, P6, P7, P9, and P10 to include the unique value of 1 that is assigned to the first permission set in the first mapping 315 illustrated in FIG. 3. The DMS may similarly identify principals 435 associated with each other unique value. For example, the DMS may evaluate the second permission set including A0, A3, and A4. The DMS may determine that the second permission set indicates principals P1, P2, P3, P11, and P12. The DMS may update entries for the principals P1, P2, P3, P11, and P12 in the second mapping 420 to include the unique value of 1 accordingly. The DMS may similarly generate entries for or further update the entries for all principals associated with the file system.

Additionally, or alternatively, the DMS may have previously evaluated the permission sets, and the DMS may iterate over principals during the principal mapping operation to identify which permissions the principals are included in and then update the entries in the second mapping 420 accordingly. It is to be understood that the DMS may generate the first mapping 315 and the second mapping 420 in any order or at the same time. For example, the DMS may generate the first mapping 315 before, after, or at the same time (e.g., in at least partially overlapping time periods) as the DMS generates the second mapping 420.

The DMS may thereby perform an indexing operation based on the permissions 430 to generate the first mapping 315 between files in the file systems and unique values and to generate the second mapping 420 between principals and unique values. The DMS may use the first mapping 315 and the second mapping 420 to identify, for each principal, a respective set of one or more files from among the file system to which the principal has access. For example, the DMS may combine the first and second mappings or otherwise compare or refer to the first and second mappings based on the unique values. The unique value of 1 may be associated with files 0 and 6 and may also be associated with principals P1, P2, P3, P6, P7, P9, and P10. Thus, the DMS may determine that each of the principals P1, P2, P3, P6, P7, P9, and P10 have access to the files 0 and 6. In this example, the principal P1 may also be associated with the unique values 2 and 4. Therefore, the DMS may further determine that the principal P1 is also associated with files 1, 3, 4, and 5. If the DMS receives a query that requests access information for the principal P1 (e.g., a user), the DMS may output the access information that indicates the principal P1 has access to files 0, 1, 3, 4, 5, and 6.

Although the unique values are illustrated as single digit integers in this example, it is to be understood that the unique values may be, for example, bitmaps including multiple bits, sequences of unique numbers, or any other value or number that uniquely identifies each permission set. The file IDs may similarly be any value, sequence, or quantity of bits to uniquely identify each file.

The DMS may thereby determine per-principal access information relatively efficiently and with relatively low processing and power consumption as compared with other techniques for indexing the file system. For example, if the DMS indexes the file system by indexing over principals and files, the indexing operation may be relatively costly and complex at least because there may be a relatively large quantity of principals and a relatively large quantity of files. Thus, the DMS may take advantage of the fact that permissions 430 are generated by humans and there may be fewer permissions than principals or files to improve indexing efficiency and reduce complexity.

Figure 5:
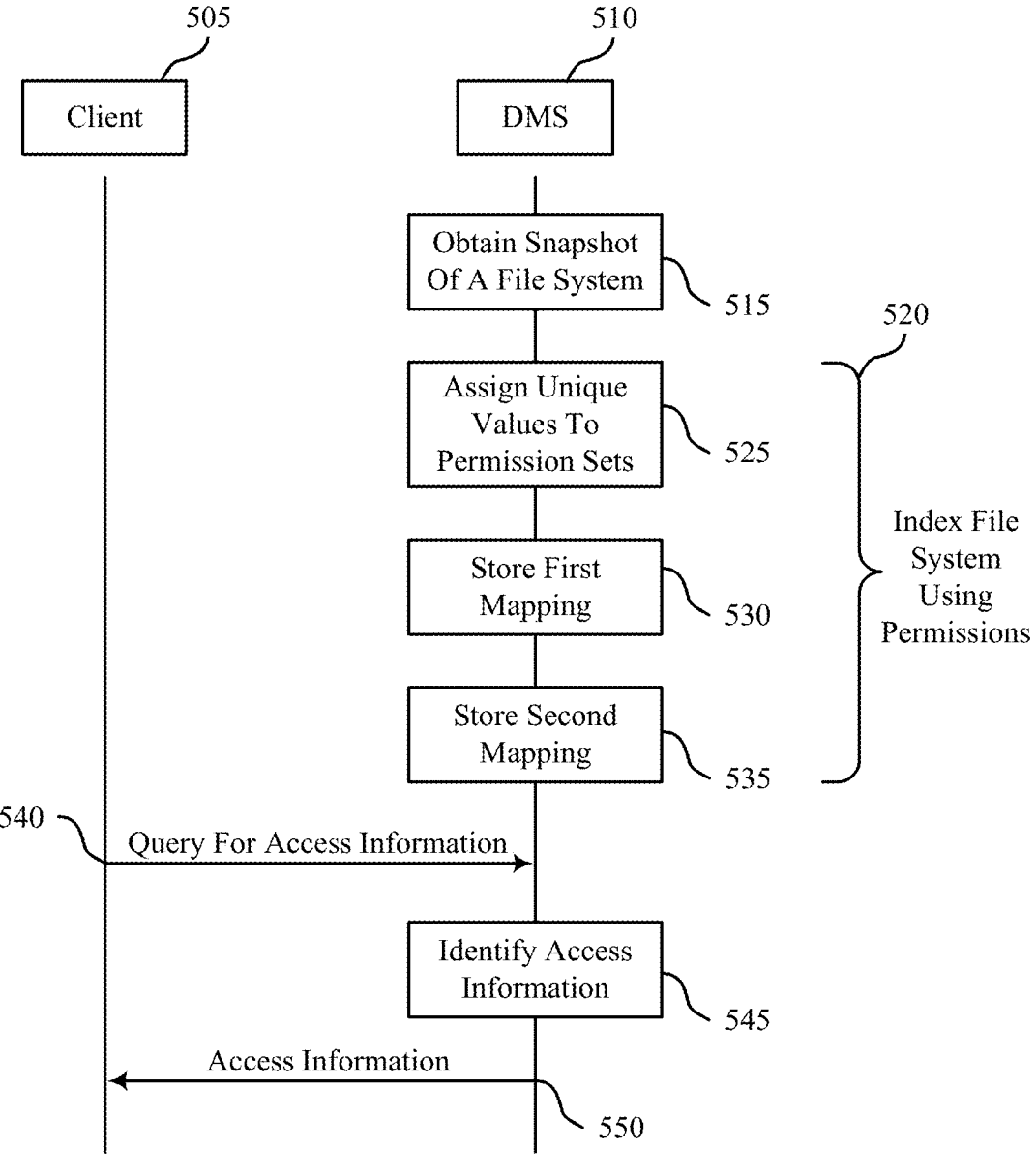
FIG. 5 shows an example of a process flow that supports indexing and querying of principals associated with a file system in accordance with aspects of the present disclosure.

FIG. 5 shows an example of a process flow 500 that supports indexing and querying of principals associated with a file system in accordance with aspects of the present disclosure. The process flow 500 may implement or may be implemented by of the computing environments 100 and 200, the unique value mapping scheme 300, the second mapping scheme 400, or any combination thereof, as described with reference to FIGS. 1-4. For example, the process flow 500 illustrates actions taken by a DMS 510 to index a file system and obtain per-principal access information for a client 505, where the DMS 510 and the client 505 may represent examples of corresponding systems and devices as described with reference to FIGS. 1-4.

In some aspects, the operations illustrated in the process flow 500 may be performed by hardware (e.g., including circuitry, processing blocks, logic components, and other components), code (e.g., software or firmware) executed by a processor, or any combination thereof. For example, aspects of the process flow 500 may be implemented or managed by a DMS 510, a per-principal index component, or some other software or application that is associated with data backup and recovery.

In the following description of the process flow 500, the operations by the client 505 and the DMS 510 may be performed in different orders or at different times. Some operations may also be left out of the process flow 500, or other operations may be added. Although the client 505 and the DMS 510 are shown performing the operations of the process flow 500, some aspects of some operations may also be performed by one or more other components or systems.

At 515, the DMS 510 may obtain a snapshot of a file system. The file system may be a file system that includes data for the client 505. The file system may include multiple files and file metadata for the files. As described with reference to FIGS. 2 and 3, the file metadata may include or indicate permissions associated with (e.g., assigned to) each file. A permission may indicate, for a given file of the file system, one or more access approvals for one or more associated principals that have access to the given file in the file system. The DMS 510 may obtain the snapshot of the file system in response to a trigger or request from the client 505, in some examples. Additionally, or alternatively, the DMS 510 may obtain the snapshot of the file system periodically or based on some condition or scenario associated with the client data.

At 520, the DMS 510 may index the file system in the snapshot using the permissions. For example, the DMS 510 may utilize the file metadata including the permission information for the files of the file system to index the file system more efficiently than if the DMS 510 uses other indexing techniques, such as indexing by users and/or files. The permissions may be generated by humans (e.g., by the client 505, or by some other engineer or manager of the client 505 or the DMS 510). As such, there may be less permissions than there are files or principals, which is why indexing based on the permissions may reduce complexity and improve efficiency.

At 525, as part of indexing the file system, the DMS 510 may assign unique values to sets of permissions. Each unique value may identify a respective set of one or more permissions. For example, the file metadata in the snapshot of the file system may indicate one or more permissions for each file. The DMS 510 may perform a scanning operation to generate a unique value table that stores the unique values for the permission sets. The scanning operation may include multiple iterations, where an iteration includes the DMS 510 scanning the file metadata associated with a file, identifying a permission set associated with the file, and determining whether an entry exists for the permission set in the unique value table. The DMS 510 may store a unique value for the permission set if there is not already an entry in the unique value table, or the DMS 510 may skip the file if there is already an entry in the unique value table. The DMS 510 may move to a next iteration of the scanning operation associated with a next file in the file system, and so on, until all of the permission sets are assigned to a respective unique value. In some examples, the unique values may be referred to as ranks.

At 530, as part of indexing the file system, the DMS 510 may generate and store a first mapping between the files and the unique values based on the permission sets associated with the files. For example, the DMS 510 may perform one or more iterations of a mapping operation to generate a table for the first mapping. The table may represent an example of the first mapping 315 described with reference to FIG. 3. Each iteration of the mapping operation may be associated with a respective unique value (e.g., one iteration for each unique value). For example, the DMS 510 may scan the file metadata for each unique value, identify, for each unique value, any file in the file system that is associated with the unique value (e.g., any file that includes the permission set that is mapped to the unique value), and store an entry in the table that maps the unique value to the one or more identified files.

At 535, as part of indexing the file system, the DMS 510 may generate and store a second mapping between the principals and the unique values based on an evaluation of the permission sets. For example, the DMS 510 may perform one or more iterations of a principal mapping operation to generate a table for the second mapping. The table may represent an example of the second mapping 420 described with reference to FIG. 4. Each iteration of the principal mapping operation may be associated with a respective permission set and may include the DMS 510 evaluating the permission set to identify a set of one or more principals that is included in the permission set. For each identified principal in the permission set, the DMS 510 may generate an entry in the second mapping table or may identify an already-generated entry for the principal, and the DMS 510 may store a unique value that is assigned to the permission set in the entry, as described with reference to FIG. 4. The DMS 510 may continue to perform iterations until each permission set is evaluated and accounted for in the second mapping. In some examples, the DMS 510 may evaluate the permission sets prior to performing the mapping operation or at some other time, and the DMS 510 may iterate over the principals to update the second mapping.

The DMS 510 may thereby generate and store a first mapping between files and unique values and a second mapping between principals and unique values as part of indexing the file system at 520. By utilizing the permission sets to facilitate the indexing, the DMS 510 may perform the indexing more efficiently and reliably than other systems in which the DMS 510 may index per user, per file, or both, because there may be fewer permission sets than users or files.

At 540, in some examples, the client 505 may transmit a query to the DMS 510. The query may request access information for a given principal. For example, the client 505 may request for information that indicates which files a first principal (e.g., P1) has access to in the file system.

At 545, in response to the query, the DMS 510 may use the first mapping and the second mapping to identify which files the principal has access to. For example, the DMS 510 may identify the principal in the second mapping (e.g., based on an SID of the principal included in the query). An entry for the principal in the second mapping may indicate a set of unique values associated with the principal. The DMS 510 may then identify the unique values in the first mapping. The set of files may include any files that are mapped to the unique values in the first mapping. That is, the DMS 510 may filter the files based on the unique values to identify which files the principal has access to. At 550, the DMS 510 may output information that indicates IDs for the set of files. For example, the DMS 510 may transmit, to the client 505 in response to the query, the access information for the principal. The DMS 510 may thereby identify per-principal access information.

Figure 6:
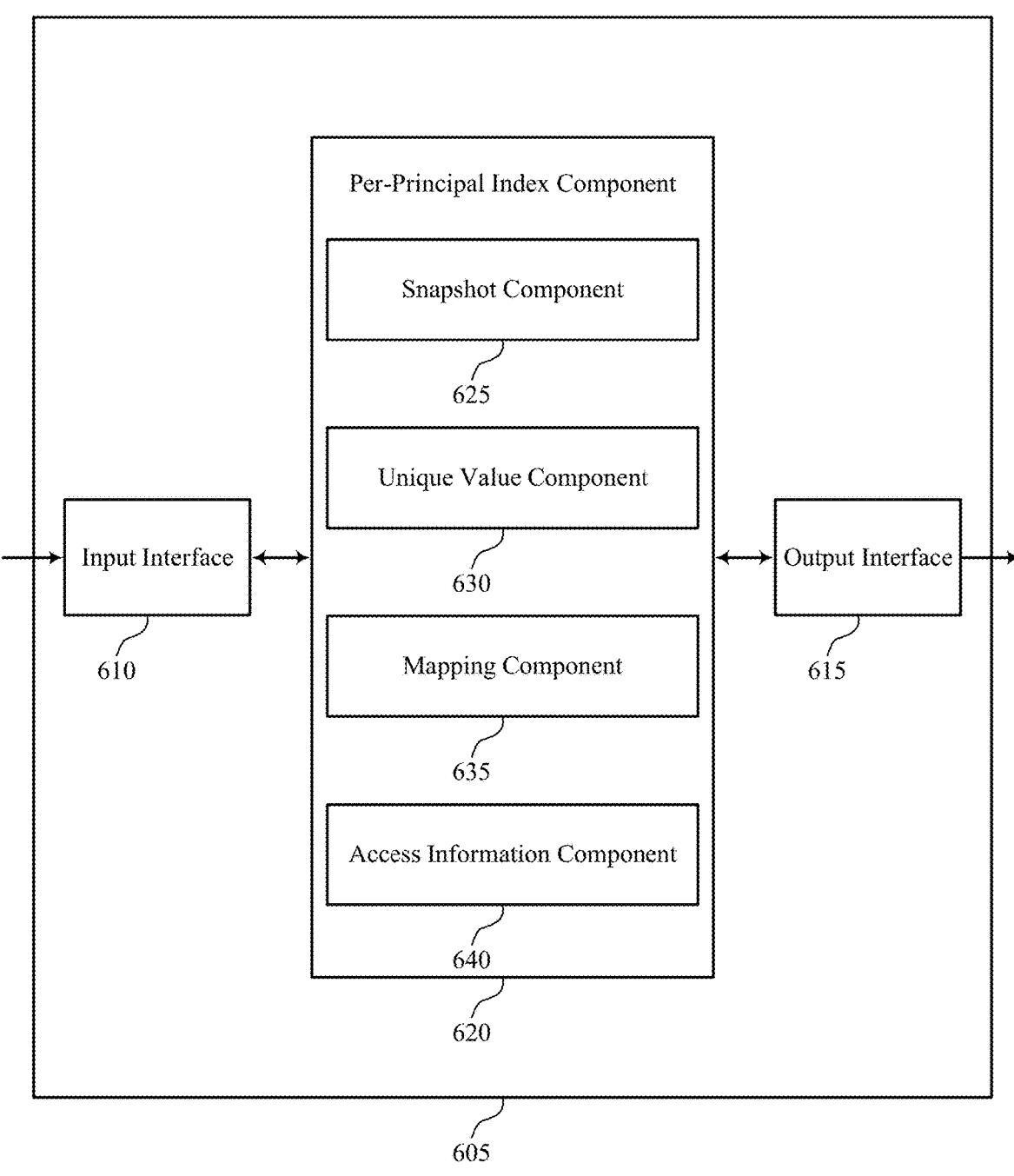
FIG. 6 shows a block diagram of an apparatus that supports indexing and querying of principals associated with a file system in accordance with aspects of the present disclosure.

FIG. 6 shows a block diagram 600 of a system 605 that supports indexing and querying of principals associated with a file system in accordance with aspects of the present disclosure. In some examples, the system 605 may be an example of aspects of one or more components described with reference to FIG. 1, such as a DMS 110. The system 605 may include an input interface 610, an output interface 615, and a per-principal index component 620. The system 605 may also include one or more processors. Each of these components may be in communication with one another (e.g., via one or more buses, communications links, communications interfaces, or any combination thereof).

The input interface 610 may manage input signaling for the system 605. For example, the input interface 610 may receive input signaling (e.g., messages, packets, data, instructions, commands, or any other form of encoded information) from other systems or devices. The input interface 610 may send signaling corresponding to (e.g., representative of or otherwise based on) such input signaling to other components of the system 605 for processing. For example, the input interface 610 may transmit such corresponding signaling to the per-principal index component 620 to support indexing and querying of principals associated with a file system. In some cases, the input interface 610 may be a component of a network interface 825 as described with reference to FIG. 8.

The output interface 615 may manage output signaling for the system 605. For example, the output interface 615 may receive signaling from other components of the system 605, such as the per-principal index component 620, and may transmit such output signaling corresponding to (e.g., representative of or otherwise based on) such signaling to other systems or devices. In some cases, the output interface 615 may be a component of a network interface 825 as described with reference to FIG. 8.

For example, the per-principal index component 620 may include a snapshot component 625, a unique value component 630, a mapping component 635, an access information component 640, or any combination thereof. In some examples, the per-principal index component 620, or various components thereof, may be configured to perform various operations (e.g., receiving, monitoring, transmitting) using or otherwise in cooperation with the input interface 610, the output interface 615, or both. For example, the per-principal index component 620 may receive information from the input interface 610, send information to the output interface 615, or be integrated in combination with the input interface 610, the output interface 615, or both to receive information, transmit information, or perform various other operations as described herein.

The snapshot component 625 may be configured as or otherwise support a means for obtaining, by a DMS, a snapshot of a file system, where the file system includes a set of multiple files and a set of multiple permission sets, and where the set of multiple permission sets indicate, for respective files of the set of multiple files, one or more access approvals for one or more associated principals from among a set of multiple principals associated with the file system. The unique value component 630 may be configured as or otherwise support a means for assigning, by the DMS, a set of multiple unique values to the set of multiple permission sets, where a unique value of the set of multiple unique values identifies a respective permission set from among the set of multiple permission sets. The mapping component 635 may be configured as or otherwise support a means for storing, by the DMS, a first mapping between the set of multiple files and the set of multiple unique values based on the set of multiple permission sets that correspond to the set of multiple files. The mapping component 635 may be configured as or otherwise support a means for storing, by the DMS, a second mapping between the set of multiple principals and the set of multiple unique values based on an evaluation of the set of multiple permission sets. The access information component 640 may be configured as or otherwise support a means for using, by the DMS, the first mapping and the second mapping to identify, for a principal included in the set of multiple principals, a respective set of files from among the set of multiple files to which the principal has access.

Figure 7:
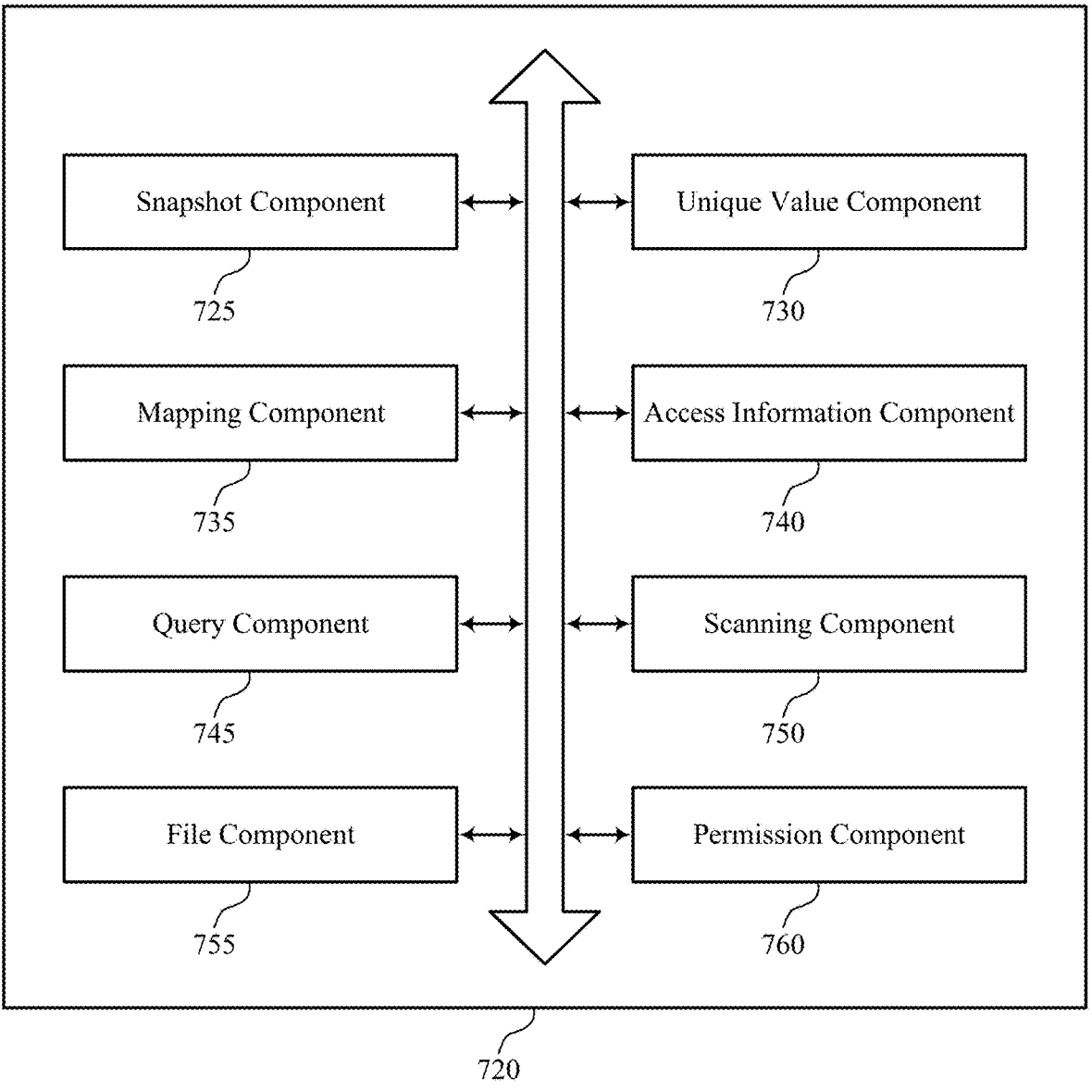
FIG. 7 shows a block diagram of a per-principal index component that supports indexing and querying of principals associated with a file system in accordance with aspects of the present disclosure.

FIG. 7 shows a block diagram 700 of a per-principal index component 720 that supports indexing and querying of principals associated with a file system in accordance with aspects of the present disclosure. The per-principal index component 720 may be an example of aspects of a per-principal index component 620 as described herein. The per-principal index component 720, or various components thereof, may be an example of means for performing various aspects of indexing and querying of principals associated with a file system as described herein. For example, the per-principal index component 720 may include a snapshot component 725, a unique value component 730, a mapping component 735, an access information component 740, a query component 745, a scanning component 750, a file component 755, a permission component 760, or any combination thereof. Each of these components, or components of subcomponents thereof (e.g., one or more processors, one or more memories), may communicate, directly or indirectly, with one another (e.g., via one or more buses, communications links, communications interfaces, or any combination thereof).

The snapshot component 725 may be configured as or otherwise support a means for obtaining, by a DMS, a snapshot of a file system, where the file system includes a set of multiple files and a set of multiple permission sets, and where the set of multiple permission sets indicate, for respective files of the set of multiple files, one or more access approvals for one or more associated principals from among a set of multiple principals associated with the file system. The unique value component 730 may be configured as or otherwise support a means for assigning, by the DMS, a set of multiple unique values to the set of multiple permission sets, where a unique value of the set of multiple unique values identifies a respective permission set from among the set of multiple permission sets. The mapping component 735 may be configured as or otherwise support a means for storing, by the DMS, a first mapping between the set of multiple files and the set of multiple unique values based on the set of multiple permission sets that correspond to the set of multiple files. In some examples, the mapping component 735 may be configured as or otherwise support a means for storing, by the DMS, a second mapping between the set of multiple principals and the set of multiple unique values based on an evaluation of the set of multiple permission sets. The access information component 740 may be configured as or otherwise support a means for using, by the DMS, the first mapping and the second mapping to identify, for a principal included in the set of multiple principals, a respective set of files from among the set of multiple files to which the principal has access.

In some examples, the query component 745 may be configured as or otherwise support a means for receiving, by the DMS, a query that requests access information for the principal, where using the first mapping and the second mapping to identify the respective set of files to which the principal has access occurs in response to the query. In some examples, the access information component 740 may be configured as or otherwise support a means for outputting, by the DMS, an indication of the respective set of files to which the principal has access in response to the query.

In some examples, the query indicates an ID of the principal, and to support using the first mapping and the second mapping to identify the respective set of files to which the principal has access, the unique value component 730 may be configured as or otherwise support a means for identifying, by the DMS and from among the set of multiple unique values, a set of one or more unique values mapped to the ID of the principal via the second mapping. In some examples, to support using the first mapping and the second mapping to identify the respective set of files to which the principal has access, the file component 755 may be configured as or otherwise support a means for identifying the respective set of files based on the respective set of files being mapped to the set of one or more unique values via the first mapping.

In some examples, the unique value component 730 may be configured as or otherwise support a means for storing, by the DMS, a unique value table based on assigning the set of multiple unique values to the set of multiple permission sets, where an entry of the unique value table is associated with a respective permission set of the set of multiple permission sets and with a unique value, from among the set of multiple unique values, that is assigned to the respective permission set.

In some examples, to support assigning the set of multiple unique values to the set of multiple permission sets, the scanning component 750 may be configured as or otherwise support a means for performing, by the DMS, a scanning operation including a set of multiple iterations over the set of multiple files included in the snapshot. In some examples, to perform an iteration of the set of multiple iterations of the scanning operation, the scanning component 750 may be configured as or otherwise support a means for scanning file metadata associated with a file of the set of multiple files included in the snapshot, the permission component 760 may be configured as or otherwise support a means for identifying, based on the file metadata and from among the set of multiple permission sets, a permission set that is associated with the file in the snapshot, the unique value component 730 may be configured as or otherwise support a means for determining, after identifying the permission set, whether a unique value table already includes an entry for the permission set, and the unique value component 730 may be configured as or otherwise support a means for storing a unique value for the permission set based on determining that the unique value table does not yet include an entry for the permission set.

In some examples, the mapping component 735 may be configured as or otherwise support a means for performing, by the DMS, a set of multiple iterations of a mapping operation to generate a table for the first mapping, where storing the first mapping includes storing the table for the first mapping. In some examples, to perform an iteration of the set of multiple iterations of the mapping operation, the scanning component 750 may be configured as or otherwise support a means for scanning file metadata associated with the set of multiple files included in the snapshot, the unique value component 730 may be configured as or otherwise support a means for identifying, based on the file metadata and from among the set of multiple files, a set of one or more files that are associated with a same unique value, where the file metadata indicates permission sets, and where identifying the set of one or more files is based on the set of multiple unique values that are assigned to the set of multiple permission sets, and the unique value component 730 may be configured as or otherwise support a means for storing an entry in the table, the entry associated with the same unique value that is common to the identified set of one or more files and including an indication of the identified set of one or more files.

In some examples, the mapping component 735 may be configured as or otherwise support a means for performing, by the DMS, a set of multiple iterations of a principal mapping operation to generate a table for the second mapping, where storing the second mapping includes storing the table for the first mapping. In some examples, to perform an iteration of the set of multiple iterations of the principal mapping operation, the permission component 760 may be configured as or otherwise support a means for evaluating a permission set of the set of multiple permission sets to identify a set of one or more principals, from among the set of multiple principals, that is included in the permission set and the unique value component 730 may be configured as or otherwise support a means for storing, in a set of one or more entries in the table, a unique value that is assigned to the permission set based on the set of one or more principals being included in the permission set, where the set of one or more entries in the table is associated with the set of one or more principals.

In some examples, a file of the set of multiple files in the snapshot is associated with a security descriptor that includes a respective permission set from among the set of multiple permission sets. In some examples, the set of multiple principals includes users, groups of users, or any combination thereof.

Figure 8:
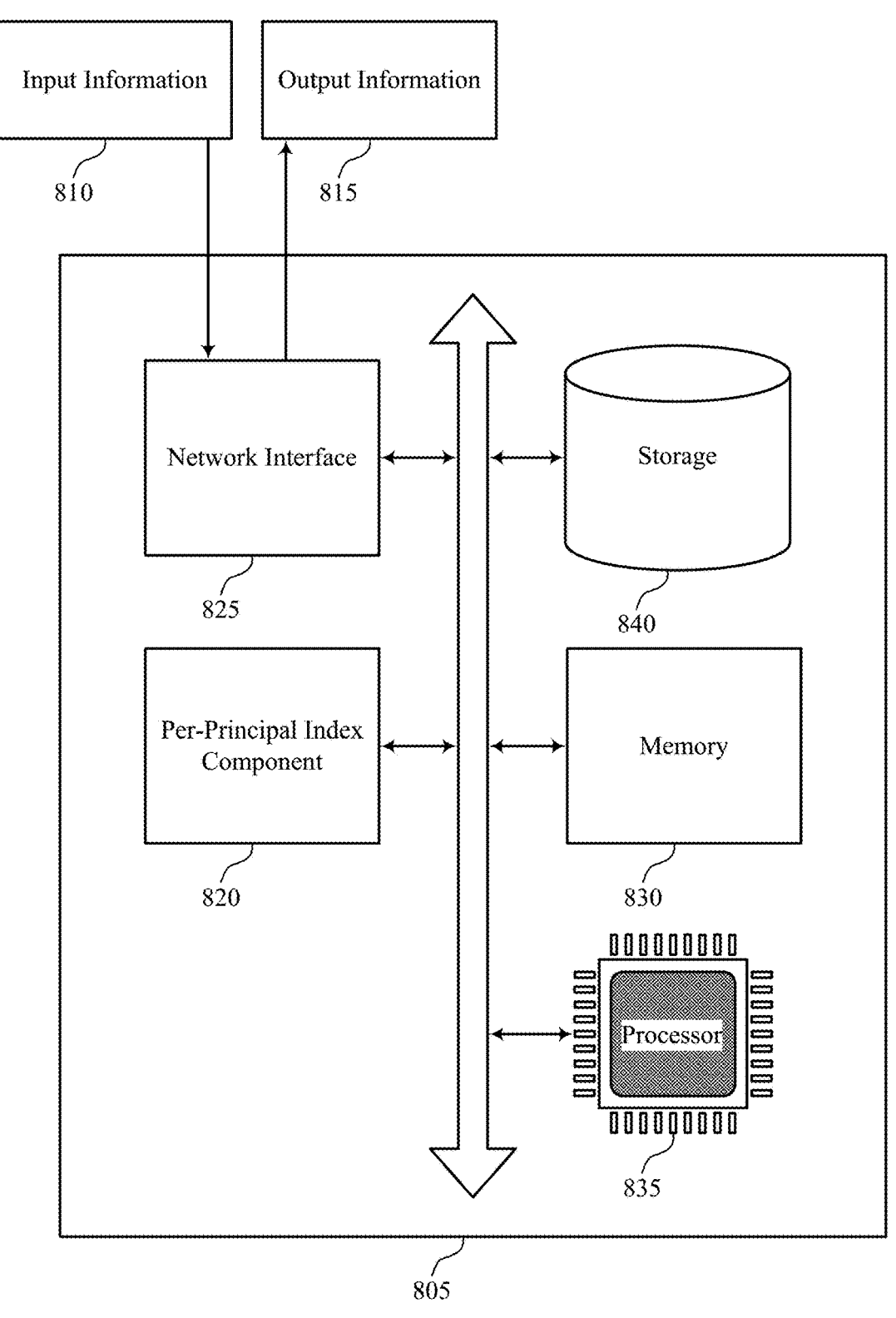
FIG. 8 shows a diagram of a system including a device that supports indexing and querying of principals associated with a file system in accordance with aspects of the present disclosure.

FIG. 8 shows a block diagram 800 of a system 805 that supports indexing and querying of principals associated with a file system in accordance with aspects of the present disclosure. The system 805 may be an example of or include the components of a system 605 or a DMS as described herein as described herein. The system 805 may include components for data management, including components such as a per-principal index component 820, an input information 810, an output information 815, a network interface 825, at least one memory 830, at least one processor 835, and a storage 840. These components may be in electronic communication or otherwise coupled with each other (e.g., operatively, communicatively, functionally, electronically, electrically; via one or more buses, communications links, communications interfaces, or any combination thereof). Additionally, the components of the system 805 may include corresponding physical components or may be implemented as corresponding virtual components (e.g., components of one or more virtual machines). In some examples, the system 805 may be an example of aspects of one or more components described with reference to FIG. 1, such as a DMS 110.

The network interface 825 may enable the system 805 to exchange information (e.g., input information 810, output information 815, or both) with other systems or devices (not shown). For example, the network interface 825 may enable the system 805 to connect to a network (e.g., a network 120 as described herein). The network interface 825 may include one or more wireless network interfaces, one or more wired network interfaces, or any combination thereof. In some examples, the network interface 825 may be an example of may be an example of aspects of one or more components described with reference to FIG. 1, such as one or more network interfaces 165.

Memory 830 may include RAM, ROM, or both. The memory 830 may store computer-readable, computer-executable software including instructions that, when executed, cause the processor 835 to perform various functions described herein. In some cases, the memory 830 may contain, among other things, a basic input/output system (BIOS), which may control basic hardware or software operation such as the interaction with peripheral components or devices. In some cases, the memory 830 may be an example of aspects of one or more components described with reference to FIG. 1, such as one or more memories 175.

The processor 835 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 835 may be configured to execute computer-readable instructions stored in a memory 830 to perform various functions (e.g., functions or tasks supporting indexing and querying of principals associated with a file system). Though a single processor 835 is depicted in the example of FIG. 8, it is to be understood that the system 805 may include any quantity of one or more of processors 835 and that a group of processors 835 may collectively perform one or more functions ascribed herein to a processor, such as the processor 835. In some cases, the processor 835 may be an example of aspects of one or more components described with reference to FIG. 1, such as one or more processors 170.

Storage 840 may be configured to store data that is generated, processed, stored, or otherwise used by the system 805. In some cases, the storage 840 may include one or more HDDs, one or more SDDs, or both. In some examples, the storage 840 may be an example of a single database, a distributed database, multiple distributed databases, a data store, a data lake, or an emergency backup database. In some examples, the storage 840 may be an example of one or more components described with reference to FIG. 1, such as one or more network disks 180.

For example, the per-principal index component 820 may be configured as or otherwise support a means for obtaining, by a DMS, a snapshot of a file system, where the file system including a set of multiple files and a set of multiple permission sets, and where the set of multiple permission sets indicate, for respective files of the set of multiple files, one or more access approvals for one or more associated principals from among a set of multiple principals associated with the file system. The per-principal index component 820 may be configured as or otherwise support a means for assigning, by the DMS, a set of multiple unique values to the set of multiple permission sets, where a unique value of the set of multiple unique values identifies a respective permission set from among the set of multiple permission sets. The per-principal index component 820 may be configured as or otherwise support a means for storing, by the DMS, a first mapping between the set of multiple files and the set of multiple unique values based on the set of multiple permission sets that correspond to the set of multiple files. The per-principal index component 820 may be configured as or otherwise support a means for storing, by the DMS, a second mapping between the set of multiple principals and the set of multiple unique values based on an evaluation of the set of multiple permission sets. The per-principal index component 820 may be configured as or otherwise support a means for using, by the DMS, the first mapping and the second mapping to identify, for a principal included in the set of multiple principals, a respective set of files from among the set of multiple files to which the principal has access.

By including or configuring the per-principal index component 820 in accordance with examples as described herein, the system 805 may support techniques for indexing and querying of principals associated with a file system, which may provide one or more benefits such as, for example, improved reliability, reduced latency, reduced power consumption, more efficient utilization of computing resources, network resources or both, and improved scalability, among other possibilities.

FIG. 9 shows a flowchart illustrating a method 900 that supports indexing and querying of principals associated with a file system in accordance with aspects of the present disclosure. The operations of the method 900 may be implemented by a DMS or its components as described herein. For example, the operations of the method 900 may be performed by a DMS as described with reference to FIGS. 1 through 8. In some examples, a DMS may execute a set of instructions to control the functional elements of the DMS to perform the described functions. Additionally, or alternatively, the DMS may perform aspects of the described functions using special-purpose hardware.

At 905, the method may include obtaining, by a DMS, a snapshot of a file system, where the file system includes a set of multiple files and a set of multiple permission sets, and where the set of multiple permission sets indicate, for respective files of the set of multiple files, one or more access approvals for one or more associated principals from among a set of multiple principals associated with the file system. The operations of block 905 may be performed in accordance with examples as disclosed herein. In some examples, aspects of the operations of 905 may be performed by a snapshot component 725 as described with reference to FIG. 7.

At 910, the method may include assigning, by the DMS, a set of multiple unique values to the set of multiple permission sets, where a unique value of the set of multiple unique values identifies a respective permission set from among the set of multiple permission sets. The operations of block 910 may be performed in accordance with examples as disclosed herein. In some examples, aspects of the operations of 910 may be performed by a unique value component 730 as described with reference to FIG. 7.

At 915, the method may include storing, by the DMS, a first mapping between the set of multiple files and the set of multiple unique values based on the set of multiple permission sets that correspond to the set of multiple files. The operations of block 915 may be performed in accordance with examples as disclosed herein. In some examples, aspects of the operations of 915 may be performed by a mapping component 735 as described with reference to FIG. 7.

At 920, the method may include storing, by the DMS, a second mapping between the set of multiple principals and the set of multiple unique values based on an evaluation of the set of multiple permission sets. The operations of block 920 may be performed in accordance with examples as disclosed herein. In some examples, aspects of the operations of 920 may be performed by a mapping component 735 as described with reference to FIG. 7.

At 925, the method may include using, by the DMS, the first mapping and the second mapping to identify, for a principal included in the set of multiple principals, a respective set of files from among the set of multiple files to which the principal has access. The operations of block 925 may be performed in accordance with examples as disclosed herein. In some examples, aspects of the operations of 925 may be performed by an access information component 740 as described with reference to FIG. 7.

FIG. 10 shows a flowchart illustrating a method 1000 that supports indexing and querying of principals associated with a file system in accordance with aspects of the present disclosure. The operations of the method 1000 may be implemented by a DMS or its components as described herein. For example, the operations of the method 1000 may be performed by a DMS as described with reference to FIGS. 1 through 8. In some examples, a DMS may execute a set of instructions to control the functional elements of the DMS to perform the described functions. Additionally, or alternatively, the DMS may perform aspects of the described functions using special-purpose hardware.

At 1005, the method may include obtaining, by a DMS, a snapshot of a file system, where the file system includes a set of multiple files and a set of multiple permission sets, and where the set of multiple permission sets indicate, for respective files of the set of multiple files, one or more access approvals for one or more associated principals from among a set of multiple principals associated with the file system. The operations of block 1005 may be performed in accordance with examples as disclosed herein. In some examples, aspects of the operations of 1005 may be performed by a snapshot component 725 as described with reference to FIG. 7.

At 1010, the method may include assigning, by the DMS, a set of multiple unique values to the set of multiple permission sets, where a unique value of the set of multiple unique values identifies a respective permission set from among the set of multiple permission sets. The operations of block 1010 may be performed in accordance with examples as disclosed herein. In some examples, aspects of the operations of 1010 may be performed by a unique value component 730 as described with reference to FIG. 7.

At 1015, the method may include storing, by the DMS, a first mapping between the set of multiple files and the set of multiple unique values based on the set of multiple permission sets that correspond to the set of multiple files. The operations of block 1015 may be performed in accordance with examples as disclosed herein. In some examples, aspects of the operations of 1015 may be performed by a mapping component 735 as described with reference to FIG. 7.

At 1020, the method may include storing, by the DMS, a second mapping between the set of multiple principals and the set of multiple unique values based on an evaluation of the set of multiple permission sets. The operations of block 1020 may be performed in accordance with examples as disclosed herein. In some examples, aspects of the operations of 1020 may be performed by a mapping component 735 as described with reference to FIG. 7.

At 1025, the method may include receiving, by the DMS, a query that requests access information for a principal included in the set of multiple principals. The operations of block 1025 may be performed in accordance with examples as disclosed herein. In some examples, aspects of the operations of 1025 may be performed by a query component 745 as described with reference to FIG. 7.

At 1030, the method may include using, by the DMS in response to the query, the first mapping and the second mapping to identify, for the principal, a respective set of files from among the set of multiple files to which the principal has access. The operations of block 1030 may be performed in accordance with examples as disclosed herein. In some examples, aspects of the operations of 1030 may be performed by an access information component 740 as described with reference to FIG. 7.

At 1035, the method may include outputting, by the DMS, an indication of the respective set of files to which the principal has access in response to the query. The operations of block 1035 may be performed in accordance with examples as disclosed herein. In some examples, aspects of the operations of 1035 may be performed by an access information component 740 as described with reference to FIG. 7.

FIG. 11 shows a flowchart illustrating a method 1100 that supports indexing and querying of principals associated with a file system in accordance with aspects of the present disclosure. The operations of the method 1100 may be implemented by a DMS or its components as described herein. For example, the operations of the method 1100 may be performed by a DMS as described with reference to FIGS. 1 through 8. In some examples, a DMS may execute a set of instructions to control the functional elements of the DMS to perform the described functions. Additionally, or alternatively, the DMS may perform aspects of the described functions using special-purpose hardware.

At 1105, the method may include obtaining, by a DMS, a snapshot of a file system, where the file system includes a set of multiple files and a set of multiple permission sets, and where the set of multiple permission sets indicate, for respective files of the set of multiple files, one or more access approvals for one or more associated principals from among a set of multiple principals associated with the file system. The operations of block 1105 may be performed in accordance with examples as disclosed herein. In some examples, aspects of the operations of 1105 may be performed by a snapshot component 725 as described with reference to FIG. 7.

At 1110, the method may include assigning, by the DMS, a set of multiple unique values to the set of multiple permission sets, where a unique value of the set of multiple unique values identifies a respective permission set from among the set of multiple permission sets. The operations of block 1110 may be performed in accordance with examples as disclosed herein. In some examples, aspects of the operations of 1110 may be performed by a unique value component 730 as described with reference to FIG. 7.

At 1115, the method may include storing, by the DMS, a unique value table based on assigning the set of multiple unique values to the set of multiple permission sets, where an entry of the unique value table is associated with a respective permission set of the set of multiple permission sets and with a unique value, from among the set of multiple unique values, that is assigned to the respective permission set. The operations of block 1115 may be performed in accordance with examples as disclosed herein. In some examples, aspects of the operations of 1115 may be performed by a unique value component 730 as described with reference to FIG. 7.

At 1120, the method may include storing, by the DMS, a first mapping between the set of multiple files and the set of multiple unique values based on the set of multiple permission sets that correspond to the set of multiple files. The operations of block 1120 may be performed in accordance with examples as disclosed herein. In some examples, aspects of the operations of 1120 may be performed by a mapping component 735 as described with reference to FIG. 7.

At 1125, the method may include storing, by the DMS, a second mapping between the set of multiple principals and the set of multiple unique values based on an evaluation of the set of multiple permission sets. The operations of block 1125 may be performed in accordance with examples as disclosed herein. In some examples, aspects of the operations of 1125 may be performed by a mapping component 735 as described with reference to FIG. 7.

At 1130, the method may include using, by the DMS, the first mapping and the second mapping to identify, for a principal included in the set of multiple principals, a respective set of files from among the set of multiple files to which the principal has access. The operations of block 1130 may be performed in accordance with examples as disclosed herein. In some examples, aspects of the operations of 1130 may be performed by an access information component 740 as described with reference to FIG. 7.

A method by an apparatus is described. The method may include obtaining, by a DMS, a snapshot of a file system, where the file system includes a set of multiple files and a set of multiple permission sets, and where the set of multiple permission sets indicate, for respective files of the set of multiple files, one or more access approvals for one or more associated principals from among a set of multiple principals associated with the file system, assigning, by the DMS, a set of multiple unique values to the set of multiple permission sets, where a unique value of the set of multiple unique values identifies a respective permission set from among the set of multiple permission sets, storing, by the DMS, a first mapping between the set of multiple files and the set of multiple unique values based on the set of multiple permission sets that correspond to the set of multiple files, storing, by the DMS, a second mapping between the set of multiple principals and the set of multiple unique values based on an evaluation of the set of multiple permission sets, and using, by the DMS, the first mapping and the second mapping to identify, for a principal included in the set of multiple principals, a respective set of files from among the set of multiple files to which the principal has access.

An apparatus is described. The apparatus may include one or more memories storing processor executable code, and one or more processors coupled with the one or more memories. The one or more processors may individually or collectively operable to execute the code to cause the apparatus to obtain, by a DMS, a snapshot of a file system, where the file system includes a set of multiple files and a set of multiple permission sets, and where the set of multiple permission sets indicate, for respective files of the set of multiple files, one or more access approvals for one or more associated principals from among a set of multiple principals associated with the file system, assign, by the DMS, a set of multiple unique values to the set of multiple permission sets, where a unique value of the set of multiple unique values identifies a respective permission set from among the set of multiple permission sets, store, by the DMS, a first mapping between the set of multiple files and the set of multiple unique values based on the set of multiple permission sets that correspond to the set of multiple files, store, by the DMS, a second mapping between the set of multiple principals and the set of multiple unique values based on an evaluation of the set of multiple permission sets, and use, by the DMS, the first mapping and the second mapping to identify, for a principal included in the set of multiple principals, a respective set of files from among the set of multiple files to which the principal has access.

Another apparatus is described. The apparatus may include means for obtaining, by a DMS, a snapshot of a file system, where the file system includes a set of multiple files and a set of multiple permission sets, and where the set of multiple permission sets indicate, for respective files of the set of multiple files, one or more access approvals for one or more associated principals from among a set of multiple principals associated with the file system, means for assigning, by the DMS, a set of multiple unique values to the set of multiple permission sets, where a unique value of the set of multiple unique values identifies a respective permission set from among the set of multiple permission sets, means for storing, by the DMS, a first mapping between the set of multiple files and the set of multiple unique values based on the set of multiple permission sets that correspond to the set of multiple files, means for storing, by the DMS, a second mapping between the set of multiple principals and the set of multiple unique values based on an evaluation of the set of multiple permission sets, and means for using, by the DMS, the first mapping and the second mapping to identify, for a principal included in the set of multiple principals, a respective set of files from among the set of multiple files to which the principal has access.

A non-transitory computer-readable medium storing code is described. The code may include instructions executable by a processor to obtain, by a DMS, a snapshot of a file system, where the file system includes a set of multiple files and a set of multiple permission sets, and where the set of multiple permission sets indicate, for respective files of the set of multiple files, one or more access approvals for one or more associated principals from among a set of multiple principals associated with the file system, assign, by the DMS, a set of multiple unique values to the set of multiple permission sets, where a unique value of the set of multiple unique values identifies a respective permission set from among the set of multiple permission sets, store, by the DMS, a first mapping between the set of multiple files and the set of multiple unique values based on the set of multiple permission sets that correspond to the set of multiple files, store, by the DMS, a second mapping between the set of multiple principals and the set of multiple unique values based on an evaluation of the set of multiple permission sets, and use, by the DMS, the first mapping and the second mapping to identify, for a principal included in the set of multiple principals, a respective set of files from among the set of multiple files to which the principal has access.

Some examples of the method, apparatus, and non-transitory computer-readable medium described herein may further include operations, features, means, or instructions for receiving, by the DMS, a query that requests access information for the principal, where using the first mapping and the second mapping to identify the respective set of files to which the principal may have access occurs in response to the query and outputting, by the DMS, an indication of the respective set of files to which the principal may have access in response to the query.

In some examples of the method, apparatus, and non-transitory computer-readable medium described herein, the query indicates an ID of the principal, and using the first mapping and the second mapping to identify the respective set of files to which the principal may have access may include operations, features, means, or instructions for identifying, by the DMS and from among the set of multiple unique values, a set of one or more unique values mapped to the ID of the principal via the second mapping and identifying the respective set of files based on the respective set of files being mapped to the set of one or more unique values via the first mapping.

Some examples of the method, apparatus, and non-transitory computer-readable medium described herein may further include operations, features, means, or instructions for storing, by the DMS, a unique value table based on assigning the set of multiple unique values to the set of multiple permission sets, where an entry of the unique value table may be associated with a respective permission set of the set of multiple permission sets and with a unique value, from among the set of multiple unique values, that may be assigned to the respective permission set.

In some examples of the method, apparatus, and non-transitory computer-readable medium described herein, assigning the set of multiple unique values to the set of multiple permission sets may include operations, features, means, or instructions for performing, by the DMS, a scanning operation including a set of multiple iterations over the set of multiple files included in the snapshot, where performing an iteration of the set of multiple iterations of the scanning operation includes scanning file metadata associated with a file of the set of multiple files included in the snapshot, identifying, based on the file metadata and from among the set of multiple permission sets, a permission set that may be associated with the file in the snapshot, determining, after identifying the permission set, whether a unique value table already includes an entry for the permission set, and storing a unique value for the permission set based on determining that the unique value table does not yet include an entry for the permission set.

Some examples of the method, apparatus, and non-transitory computer-readable medium described herein may further include operations, features, means, or instructions for performing, by the DMS, a set of multiple iterations of a mapping operation to generate a table for the first mapping, where storing the first mapping includes storing the table for the first mapping, and where performing an iteration of the set of multiple iterations of the mapping operation includes scanning file metadata associated with the set of multiple files included in the snapshot, identifying, based on the file metadata and from among the set of multiple files, a set of one or more files that may be associated with a same unique value, where the file metadata indicates permission sets, and where identifying the set of one or more files may be based on the set of multiple unique values that may be assigned to the set of multiple permission sets, and storing an entry in the table, the entry associated with the same unique value that may be common to the identified set of one or more files and including an indication of the identified set of one or more files.

Some examples of the method, apparatus, and non-transitory computer-readable medium described herein may further include operations, features, means, or instructions for performing, by the DMS, a set of multiple iterations of a principal mapping operation to generate a table for the second mapping, where storing the second mapping includes storing the table for the first mapping, and where performing an iteration of the set of multiple iterations of the principal mapping operation includes evaluating a permission set of the set of multiple permission sets to identify a set of one or more principals, from among the set of multiple principals, that may be included in the permission set and storing, in a set of one or more entries in the table, a unique value that may be assigned to the permission set based on the set of one or more principals being included in the permission set, where the set of one or more entries in the table may be associated with the set of one or more principals.

In some examples of the method, apparatus, and non-transitory computer-readable medium described herein, a file of the set of multiple files in the snapshot may be associated with a security descriptor that includes a respective permission set from among the set of multiple permission sets.

In some examples of the method, apparatus, and non-transitory computer-readable medium described herein, the set of multiple principals includes users, groups of users, or any combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:

obtaining, by a data management system, a snapshot of a file system, wherein the file system comprises a plurality of files and a plurality of permission sets, and wherein the plurality of permission sets indicate, for respective files of the plurality of files, one or more access approvals for one or more associated principals from among a plurality of principals associated with the file system;

assigning, by the data management system, a plurality of unique values to the plurality of permission sets, wherein a unique value of the plurality of unique values identifies a respective permission set from among the plurality of permission sets;

storing, by the data management system, a first mapping between the plurality of files and the plurality of unique values based at least in part on the plurality of permission sets that correspond to the plurality of files;

storing, by the data management system, a second mapping between the plurality of principals and the plurality of unique values based at least in part on an evaluation of the plurality of permission sets; and using, by the data management system, the first mapping and the second mapping to identify, for a principal included in the plurality of principals, a respective set of files from among the plurality of files to which the principal has access.

2. The method of claim 1, further comprising:

receiving, by the data management system, a query that requests access information for the principal, wherein using the first mapping and the second mapping to identify the respective set of files to which the principal has access occurs in response to the query; and outputting, by the data management system, an indication of the respective set of files to which the principal has access in response to the query.

3. The method of claim 2, wherein the query indicates an identifier of the principal, and wherein using the first mapping and the second mapping to identify the respective set of files to which the principal has access comprises:

identifying, by the data management system and from among the plurality of unique values, a set of one or more unique values mapped to the identifier of the principal via the second mapping; and identifying the respective set of files based at least in part on the respective set of files being mapped to the set of one or more unique values via the first mapping.

4. The method of claim 1, further comprising:

storing, by the data management system, a unique value table based at least in part on assigning the plurality of unique values to the plurality of permission sets, wherein an entry of the unique value table is associated with a respective permission set of the plurality of permission sets and with a unique value, from among the plurality of unique values, that is assigned to the respective permission set.

5. The method of claim 1, wherein assigning the plurality of unique values to the plurality of permission sets comprises:

performing, by the data management system, a scanning operation comprising a plurality of iterations over the plurality of files included in the snapshot, wherein performing an iteration of the plurality of iterations of the scanning operation comprises:

scanning file metadata associated with a file of the plurality of files included in the snapshot;

identifying, based at least in part on the file metadata and from among the plurality of permission sets, a permission set that is associated with the file in the snapshot;

determining, after identifying the permission set, whether a unique value table already includes an entry for the permission set; and storing a unique value for the permission set based at least in part on determining that the unique value table does not yet include an entry for the permission set.

6. The method of claim 1, further comprising:

performing, by the data management system, a plurality of iterations of a mapping operation to generate a table for the first mapping, wherein storing the first mapping comprises storing the table for the first mapping, and wherein performing an iteration of the plurality of iterations of the mapping operation comprises:

scanning file metadata associated with the plurality of files included in the snapshot;

identifying, based at least in part on the file metadata and from among the plurality of files, a set of one or more files that are associated with a same unique value, wherein the file metadata indicates access control list sets, and wherein identifying the set of one or more files is based at least in part on the plurality of unique values that are assigned to the plurality of permission sets; and storing an entry in the table, the entry associated with the same unique value that is common to the identified set of one or more files and comprising an indication of the identified set of one or more files.

7. The method of claim 1, further comprising:

performing, by the data management system, a plurality of iterations of a principal mapping operation to generate a table for the second mapping, wherein storing the second mapping comprises storing the table for the first mapping, and wherein performing an iteration of the plurality of iterations of the principal mapping operation comprises:

evaluating a permission set of the plurality of permission sets to identify a set of one or more principals, from among the plurality of principals, that is included in the permission set; and storing, in a set of one or more entries in the table, a unique value that is assigned to the permission set based at least in part on the set of one or more principals being included in the permission set, wherein the set of one or more entries in the table is associated with the set of one or more principals.

8. The method of claim 1, wherein a file of the plurality of files in the snapshot is associated with a security descriptor that comprises a respective permission set from among the plurality of permission sets.

9. The method of claim 1, wherein the plurality of principals comprises users, groups of users, or any combination thereof.

10. An apparatus, comprising:

one or more memories storing processor-executable code; and one or more processors coupled with the one or more memories and individually or collectively operable to execute the code to cause the apparatus to:

obtain, by a data management system, a snapshot of a file system, wherein the file system comprises a plurality of files and a plurality of permission sets, and wherein the plurality of permission sets indicate, for respective files of the plurality of files, one or more access approvals for one or more associated principals from among a plurality of principals associated with the file system;

assign, by the data management system, a plurality of unique values to the plurality of permission sets, wherein a unique value of the plurality of unique values identifies a respective permission set from among the plurality of permission sets;

store, by the data management system, a first mapping between the plurality of files and the plurality of unique values based at least in part on the plurality of permission sets that correspond to the plurality of files;

store, by the data management system, a second mapping between the plurality of principals and the plurality of unique values based at least in part on an evaluation of the plurality of permission sets; and use, by the data management system, the first mapping and the second mapping to identify, for a principal included in the plurality of principals, a respective set of files from among the plurality of files to which the principal has access.

11. The apparatus of claim 10, wherein the one or more processors are individually or collectively further operable to execute the code to cause the apparatus to:

receive, by the data management system, a query that requests access information for the principal, wherein using the first mapping and the second mapping to identify the respective set of files to which the principal has access occurs in response to the query; and output, by the data management system, an indication of the respective set of files to which the principal has access in response to the query.

12. The apparatus of claim 11, wherein:

the query indicates an identifier of the principal; and to use the first mapping and the second mapping to identify the respective set of files to which the principal has access, the one or more processors are individually or collectively operable to execute the code to cause the apparatus to:

identify, by the data management system and from among the plurality of unique values, a set of one or more unique values mapped to the identifier of the principal via the second mapping; and identify the respective set of files based at least in part on the respective set of files being mapped to the set of one or more unique values via the first mapping.

13. The apparatus of claim 10, wherein the one or more processors are individually or collectively further operable to execute the code to cause the apparatus to:

store, by the data management system, a unique value table based at least in part on assigning the plurality of unique values to the plurality of permission sets, wherein an entry of the unique value table is associated with a respective permission set of the plurality of permission sets and with a unique value, from among the plurality of unique values, that is assigned to the respective permission set.

14. The apparatus of claim 10, wherein, to assign the plurality of unique values to the plurality of permission sets, the one or more processors are individually or collectively operable to execute the code to cause the apparatus to:

perform, by the data management system, a scanning operation comprising a plurality of iterations over the plurality of files included in the snapshot, wherein, to perform an iteration of the plurality of iterations of the scanning operation, the one or more processors are individually or collectively operable to execute the code to cause the apparatus to:

scan file metadata associated with a file of the plurality of files included in the snapshot;

identify, based at least in part on the file metadata and from among the plurality of permission sets, a permission set that is associated with the file in the snapshot;

determine, after identifying the permission set, whether a unique value table already includes an entry for the permission set; and store a unique value for the permission set based at least in part on determining that the unique value table does not yet include an entry for the permission set.

15. The apparatus of claim 10, wherein the one or more processors are individually or collectively further operable to execute the code to cause the apparatus to:

perform, by the data management system, a plurality of iterations of a mapping operation to generate a table for the first mapping, wherein storing the first mapping comprises storing the table for the first mapping, and wherein, to perform an iteration of the plurality of iterations of the mapping operation, the one or more processors are individually or collectively operable to execute the code to cause the apparatus to:

scan file metadata associated with the plurality of files included in the snapshot;

identify, based at least in part on the file metadata and from among the plurality of files, a set of one or more files that are associated with a same unique value, wherein the file metadata indicates permission sets, and wherein identifying the set of one or more files is based at least in part on the plurality of unique values that are assigned to the plurality of permission sets; and store an entry in the table, the entry associated with the same unique value that is common to the identified set of one or more files and comprising an indication of the identified set of one or more files.

16. The apparatus of claim 10, wherein the one or more processors are individually or collectively further operable to execute the code to cause the apparatus to:

perform, by the data management system, a plurality of iterations of a principal mapping operation to generate a table for the second mapping, wherein storing the second mapping comprises storing the table for the first mapping, and wherein, to perform an iteration of the plurality of iterations of the principal mapping operation, the one or more processors are individually or collectively operable to execute the code to cause the apparatus to:

evaluate a permission set of the plurality of permission sets to identify a set of one or more principals, from among the plurality of principals, that is included in the permission set; and store, in a set of one or more entries in the table, a unique value that is assigned to the permission set based at least in part on the set of one or more principals being included in the permission set, wherein the set of one or more entries in the table is associated with the set of one or more principals.

17. The apparatus of claim 10, wherein a file of the plurality of files in the snapshot is associated with a security descriptor that comprises a respective permission set from among the plurality of permission sets.

18. A non-transitory computer-readable medium storing code, the code comprising instructions executable by one or more processors to:

obtain, by a data management system, a snapshot of a file system, wherein the file system comprises a plurality of files and a plurality of permission sets, and wherein the plurality of permission sets indicate, for respective files of the plurality of files, one or more access approvals for one or more associated principals from among a plurality of principals associated with the file system;

assign, by the data management system, a plurality of unique values to the plurality of permission sets, wherein a unique value of the plurality of unique values identifies a respective permission set from among the plurality of permission sets;

store, by the data management system, a first mapping between the plurality of files and the plurality of unique values based at least in part on the plurality of permission sets that correspond to the plurality of files;

store, by the data management system, a second mapping between the plurality of principals and the plurality of unique values based at least in part on an evaluation of the plurality of permission sets; and use, by the data management system, the first mapping and the second mapping to identify, for a principal included in the plurality of principals, a respective set of files from among the plurality of files to which the principal has access.

19. The non-transitory computer-readable medium of claim 18, wherein the instructions are further executable by the one or more processors to:

receive, by the data management system, a query that requests access information for the principal, wherein using the first mapping and the second mapping to identify the respective set of files to which the principal has access occurs in response to the query; and output, by the data management system, an indication of the respective set of files to which the principal has access in response to the query.

20. The non-transitory computer-readable medium of claim 18, wherein the instructions are further executable by the one or more processors to:

store, by the data management system, a unique value table based at least in part on assigning the plurality of unique values to the plurality of permission sets, wherein an entry of the unique value table is associated with a respective permission set of the plurality of permission sets and with a unique value, from among the plurality of unique values, that is assigned to the respective permission set.

* * * * *